United States Patent [19]

Koyama et al.

[11] 4,454,298

[45] * Jun. 12, 1984

[54] GRANULAR OR POWDERY PHENOL-ALDEHYDE RESIN AND PROCESS FOR PRODUCTION THEREOF

[75] Inventors: Hiroaki Koyama; Shigeo Shimizu, both of Kobe, Japan

[73] Assignee: Kanebo Ltd., Tokyo, Japan

[*] Notice: The portion of the term of this patent subsequent to Nov. 8, 2000 has been disclaimed.

[21] Appl. No.: 452,833

[22] Filed: Dec. 23, 1982

[30] Foreign Application Priority Data

Dec. 25, 1981 [JP] Japan ................................ 56-209314
Feb. 19, 1982 [JP] Japan ................................ 57-24295

[51] Int. Cl.$^3$ ...................... C08G 8/10; C08G 14/06; C08G 14/08
[52] U.S. Cl. .................................. 528/137; 525/495; 525/498; 528/129; 528/142; 528/146; 528/147; 528/153; 528/155; 528/156; 528/157; 528/162; 528/163; 528/164; 528/165
[58] Field of Search ............... 528/129, 137, 142, 146, 528/147, 153, 155, 156, 157, 162, 163, 164, 165; 525/495, 498

[56] References Cited

U.S. PATENT DOCUMENTS

| | | | |
|---|---|---|---|
| 3,419,527 | 12/1968 | Akutin et al. | 528/137 |
| 3,558,559 | 1/1971 | LeBlanc | 528/162 |
| 4,046,734 | 9/1977 | Zimmerli | 528/165 X |
| 4,169,937 | 10/1979 | Vargio et al. | 528/162 X |
| 4,206,095 | 6/1980 | Wynstra et al. | 528/137 |
| 4,317,901 | 3/1982 | Cosway | 528/137 X |
| 4,319,016 | 3/1982 | Kurobe et al. | 528/163 X |
| 4,336,179 | 6/1982 | Iyer | 528/165 X |
| 4,366,303 | 12/1982 | Kopf | 528/162 X |
| 4,414,378 | 11/1983 | Koyama et al. | 528/137 |
| 4,414,379 | 11/1983 | Koyama et al. | 528/137 |

*Primary Examiner*—Howard E. Schain
*Attorney, Agent, or Firm*—Sherman & Shalloway

[57] ABSTRACT

A granular or powdery resin which is a condensation product of a phenol and an aldehyde and optionally a nitrogen-containing compound having at least two active hydrogens, said granular or powdery resin being characterized by (A) containing spherical primary particles and secondary particles resulting from the agglomeration of the primary particles, each of said particles having a particle diameter of 0.1 to 150 microns, (B) having such a size that at least 50% by weight thereof can pass through a 100 Tyler mesh sieve, (C) having a free phenol content, determined by liquid chromatography, of not more than 500 ppm, and (D) having a methanol solubility (S) of more than 20% by weight when about 10 g of the resin is heated under reflux in 500 ml of substantially anhydrous methanol.

35 Claims, 7 Drawing Figures

GRANULAR OR POWDERY PHENOL-ALDEHYDE RESIN AND PROCESS FOR PRODUCTION THEREOF

The granular or powdery phenol-formaldehyde resin may be produced by a process which comprises contacting a phenol, or both a phenol and nitrogen-containing compound having at least two active hydrogens with a hydrochloric acid-formaldehyde bath containing (a) hydrochloric acid in a concentration of 3 to 28% by weight and (b) formaldehyde in a concentration of 3 to 25% by weight and aldehydes other than formaldehyde in a concentration of 0 to 10% by weight with (c) the total concentration of hydrochloric acid and formaldehyde being 10 to 40% by weight, while maintaining a bath ratio, defined by the quotient of the weight of the hydrochloric acid-formaldehyde bath divided by the total weight of the phenol and the nitrogen-containing compound, of at least 8, said contacting being effected such that after contacting of the phenol with the bath, white suspended particles are formed and thereafter developed into a granular or powdery solid, and during the contacting the temperature of the reaction system is maintained at not more than 45° C.

This invention relates to a novel granular or powdery phenol-aldehyde resin and a process for its production. More specifically, it relates to a novel granular or powdery phenol-aldehyde resin which has reactivity and good storage stability and flow characteristics and is suitable as a molding material, and to a novel process for its production.

Typical known phenol-formaldehyde resins are novalak resins and resol resins.

The novolak resins are usually produced by reacting an excess of phenol with formaldehyde in the presence of an acid catalyst such as oxalic acid (usually in an amount of 0.2 to 2%) while maintaining the mole ratio of phenol to formaldehyde at, for example, 1:0.7–0.9. The novolak resins so produced have no self-crosslinkability and are thermoplastic because they are composed of, as main components, tri-, tetra- and pentamers resulting from the bonding of phenol moieties mainly by methylene groups and contain almost no methylol groups. The novolak resins can be converted to cured resins by, for example, reacting them under heat with a crosslinking agent, such as hexamine (hexamethylenetetramine), which is at once a formaldehyde generator and an organic base (catalyst) generator, or by mixing them with a solid acid catalyst and paraformaldehyde and reacting them under heat. When such a novolak resin in accordance with the former method is used as a molding material, the resulting molded article will be foamed owing to the generation of ammonia by the decomposition of hexamine, or the undecomposed part of hexamine or an organic base formed as a by-product will remain in the molded article. This causes the defect that the properties of the molded article are deteriorated, and the curing reaction is time-consuming. According to the latter curing method, those parts of the novolak resin which make contact with the paraformaldehyde and the acid catalyst undergo excessive crosslinking reaction, and it is difficult to cure the resin uniformly. Furthermore, the acid catalyst or paraformaldehyde remains in the molded article to degrade its properties with the lapse of time, or troubles such as foaming occur owing to the decomposition of the acid catalyst or paraformaldehyde during curing. Another defect is that when the novolak resin is to be mixed with another resin, hexamine, the acid catalyst, paraformaldehyde, etc. remaining in it deteriorate the other resin, and that the novolak resin contains a relatively large amount (for example, about 0.5 to 2% by weight) of free phenol because of using an excess of phenol as a starting material.

A process for producing cured novolak resin fibers was recently suggested which comprises heating a novolak resin at a high tempertaure to form a product having a considerably high degree of condensation, purifying the product by removing components having a low degree of condensation thereby to obtain a product having a relatively high degree of condensation and comprising phenol moieties linked to each other by 7 to 10 methylene groups, melt-spinning the product to form novolak fibers, dipping the fibers in an aqueous solution of hydrochloric acid and formaldehyde and gradually heating the solution from room temperature to allow curing reaction to proceed from the surface of the fibers (Japanese Patent Publication No. 11284/1973). This process requires an extra step for the formation of the novolak resin having a high degree of condensation. Furthermore, when this resin is pulverized without being converted to fibers, and subjected to an external curing treatment, it is almost impossible to allow the curing reaction to proceed uniformly to the interior of the resin. Granules or powders obtained by cutting or pulverizing the cured fibers are expensive, and do not possess good flow characteristics.

On the other hand, the known resol resins are produced usually by reacting phenol with an excess of formaldehyde in the presence of a basic catalyst (about 0.2 to 2% by weight based on the phenol) such as sodium hydroxide, ammonia or an organic amine while maintaining the mole ratio of phenol to formaldehyde at, for example, 1:1–2. The resol resins so produced contain mono-, di- and trimmers of phenol having a relatively large amount of methylol groups as main components and are very reactive. It is the usual practice therefore to store them in a refrigerator as a water or methanol solution having a solids concentration of not more than 60%. The period for which such storage is possible is about 3 to 4 months at the longest. To mold and cure such a resol resin, the water or methanol is removed and the resin is heated in the optional presence of an acid catalyst. The rate of this curing reaction is very high, and, for example at 150° C., gellation occurs within several tens of seconds.

Since the resol resin has very high reactivity, it cannot be obtained as a stable granular or powdery solid. Furthermore, because a cured product of the resol resin has a highly developed three-dimensional structure, it is very hard and its conversion to a fine granular or powdery molding material is quite difficult (Japanese Patent Publication No. 12958/1979).

A method is also known which comprises reacting a mixture of phenol, formaldehyde and urea in the presence of an alkaline catalyst to prepare a modified resol resin and then condensing the modified resol resin further in the presence of an acid catalyst to produce a thermosetting resol/novolak type phenolic resin (Japenese Patent Publication No. 993/1957). According to this method, the alkaline catalyst must be replaced by the acid catalyst during the reaction, and it is difficult to control the reaction operation, for example to select a suitable time of this catalyst replacement. This patent document states that the resin obtained by this method is easy to pulverize.

Several years ago, a process was disclosed which comprises reacting a phenol and formaldehyde in the presence of at least a nitrogen-containing compound as a catalyst, and reacting the resulting condensate with a hydrophilic polymeric compound to form a granular or powdery resin (Japanese Patent Publication No. 42077/1978). The resulting resin in the non-gelled state contains as much as about 5 to 6% of free phenol (Examples 1 to 4 of the Japanese patent document), and a gelled product of the resin (Example 5 of the Japanese patent document) is a very hard non-reactive resin. Molded articles obtained from the gelled resin have deteriorated properties because of its inclusion of the nitrogen-containing compound used as catalyst or the hydrophilic polymeric compound.

A process is also known which comprises reacting a phenol and formaldehyde in a basic aqueous solution, mixing the resulting prepolymer with a protective colloid, and coagulating the prepolymer under acidity to form inert solid beads (Japanese Patent Publication No. 13491/1976). The coagulated product corresponds to a cured product of a resol resin, and has no reactivity. Furthermore, since it contains a salt or acid and the protective colloid, molded articles prepared from it have degraded properties.

It is a first object of this invention to provide a granular or powdery phenol-aldehyde resin which has high storage stability and good flow characteristics, and is reactive when molded and heated singly or in admixture with another resin, and particularly has such reactivity that when it is heated alone, it gives a self-curable resin.

A second object of this invention is to provide a phenol-aldehyde resin which is in the form of a very fine granular or powdery solid and therefore has good flow characteristics and, for example, can be smoothly passed through minute nozzles in injection molding and which can be used as a reactive filler.

A third object of this invention is to provide a granular or powdery phenol-aldehyde resin which has heat fusibility and reactivity under heat, for example at 100° C., and therefore can be suitably used as a binder for materials that cannot withstand treatment at high temperatures.

A fourth object of this invention is to provide a granular or powdery phenol-aldehyde resin which has a free phenol content of as low as not more than 500 ppm, is safe and easy to handle and does not give rise to a pollution problem.

A fifth object of this invention is to provide a granular or powdery phenol-aldehyde resin which has good storage stability at ordinary temperature, and either singly or together with another resin can be molded into an article having superior heat resistance, water resistance, alkali resistance, arc resistance, thermal insulation, mechanical properties and/or electrical properties.

An additional object of this invention is to provide a novel industrial process for producing a novel granular or powdery phenol-aldehyde resin having the various advantages given in the above description of the first to fifth objects of the invention.

Further objects and advantages of this invention will become apparent from the following description.

These objects and advantages are achieved in accordance with this invention by a granular or powdery resin which is a condensation product of a phenol and an aldehyde and optionally a nitrogen-containing compound having at least two active hydrogens, said granular or powdery resin being characterized by (A) containing spherical primary particles and secondary particles resulting from the agglomeration of the primary particles, each of said particles having a particle diameter of 0.1 to 150 microns, (B) having such a size that at least 50% by weight thereof can pass through a 100 Tyler mesh sieve, (C) having a free phenol content, determined by liquid chromatography, of not more than 500 ppm, and (D) having a methanol solubility, S defined by the following equation, of more than 20% by weight $$S = \frac{W_o - W_1}{W_o} \times 100(\%)$$

wherein $W_o$ is the weight in grams of the resin, and $W_1$ is the weight in grams of the resin left after heating under reflux. when about 10 g of the resin is heted under reflux in 500 ml of substantially anhydrous methanol.

Preferably, the granular or powdery resin provided by this invention is firstly a condensation product of a phenol and an aldehyde characterized by (A) containing spherical primary particles and secondary particles resulting from the agglomeration of the primary particles, each of said particles having a particle diameter of 0.1 to 150 microns, (B) having such a size that at least 50% by weight thereof can pass through a 100 Tyler mesh sieve, (C)' having a free phenol content, determined by liquid chromatography, of more than 50 ppm but not exceeding 500 ppm, (D) having a methanol solubility, S defined by the following equation, of more than 20% by weight $$S = \frac{W_o - W_1}{W_o} \times 100(\%)$$

wherein $W_o$ is the weight in grams of the resin, and $W_1$ is the weight in grams of the resin left after heating under reflux, when about 10 g of the resin is heated under reflux in 500 ml of substantially anhydrous methanol, and (E) having a $D_{990-1015}D_{1600}$ ratio of from 0.2 to 9.0 and a $D_{890}/D_{1600}$ ratio of from 0.09 to 1.0 in its infrared absorption spectrum measured by a KBr tablet method, wherein $D_{1600}$ represents the absorption intensity of an absorption peak at 1600 cm$^{-1}$, $D_{990-1015}$ represents the highest absorption intensity of absorption peaks in the range of 990 to 1015 cm$^{-1}$, and $D_{890}$ represents the absorption intensity of an absorption peak at 890 cm$^{-1}$; and secondly a condensation product of a phenol, an aldehyde and a nitrogen-containing compound having at least two active hydrogens characterized by (A)' containing spherical primary particles and secondary particles resulting from the agglomeration of the primary particles, each of said particles having a particle diameter of 0.1 to 100 microns, (B)' having such a size that at least 50% by weight thereof can pass through a 150 Tyler mesh sieve, (C) having a free phenol content, determined by liquid chromatography, of not more than 500 ppm, (D) having a methanol solubility, S defined by the following equation, of more than 20% by weight $$S = \frac{W_o - W_1}{W_o} \times 100(\%)$$

wherein $W_o$ is the weight in grams of the resin, and $W_1$ is the weight in grams of the resin left after heating under reflux, when about 10 g of the resin is heated under reflux in 500 ml of substantially anhydrous methanol; and (F) having a $D_{960-1020}/D_{1450-1500}$ ratio of from 0.1 to 2.0 in its infrared absorption spectrum measured by a KBr tablet method, wherein $D_{1450-1500}$ represents the highest absorption intensity of absorption peaks in the range of 1450 to 1500 cm$^{-1}$ and $D_{960-1020}$ represents the highest absorption intensity of absorption peaks in the range of 960 to 1020 cm$^{-1}$.

Especially preferably, the second resin has a $D_{1280-1360}/D_{1450-1500}$ ratio of from 0.15 to 3.0 in its infrared absorption spectrum measured by a KBr tablet method, wherein $D_{1280-1360}$ represents the highest absorption intensity of absorption peaks in the range of 1280 to 1360 cm$^{-1}$, and $D_{1450-1500}$ is as defined above.

We have found that the novel granular or powdery phenol-aldehyde resin of the invention can be produced by a process which comprises contacting a phenol, or both a phenol and a nitrogen-containing compound having at least two active hydrogens with a hydrochloric acid–formaldehyde bath containing 3 to 28% by weight of hydrochloric acid and 3 to 25% by weight of formaldehyde with the total concentration of hydrochloric acid and formaldehyde being 10 to 40% by weight, while maintaining a bath ratio, defined by the quotient of the weight of the hydrochloric acid-formaldehyde bath divided by the total weight of the phenol and the nitrogen-containing compound, of at least 8, said contacting being effected such that after contacting of the phenol with the bath, white suspended particles are formed and thereafter developed into a granular or powdery solid, and during the contacting, the temperture of the reaction system is maintained at not more than 45° C.

According to the present invention, the first resin is produced conveniently by using an HCl-formaldehyde bath containing 5 to 28% by weight of HCl and 3 to 25% by weight of formaldehyde, in which the concentration of aldehydes other than formaldehyde is from 0 to 10% by weight and the total concentration of HCl and formaldehyde is from 15 to 40% by weight.

PROCESS

According to the process of this invention, a phenol, optionally together with a nitrogen-containing compound having at least two active hydrogens, is contacted with an HCl-formaldehyde bath containing (a) hydrochloric acid (HCl) in a concentration of 3 to 28% by weight and (b) formaldehyde (HCHO) in a concentration of 3 to 25% by weight and aldehydes other than formaldehyde in a concentration of 0 to 10% by weight with (c) the total concentration of hydrochloric acid and formaldehyde being 10 to 40% by weight, while maintaining a bath ratio, defined by the quotient of the weight of the HCl-formaldehyde bath divided by the total weight of the phenol and the nitrogen-containing compound, of at least 8 and the temperature of the reaction system at not more than 45° C.

Preferably, in addition to the three requirements (a), (b) and (c), the composition of the HCl-formaldehyde bath is such that the mole ratio of the formaldehyde in the bath to the phenol to be contacted with the bath or the phenol and the nitrogen-containing compounds combined is at least 2, especially at least 2.5, above all at least 3 [requirement (d)]. There is no particular upper limit to the above mole ratio (d). Preferably, the upper limit is 20, especially 15. Higher molar ratios are not economically advantageous, On the other hand, if the mole ratio (d) is below 2.5, especially below 2, the rate of the reaction decreases and it is difficult to obtain a uniform and finely divided granular or powdery resin. The especially preferred mole ratio (d) is from 4 to 15. To adjust the mole ratio to at least 2, particularly at least 2.5, is especially effective when the bath ratio is relatively low, for example from 8 to 10.

According to this invention, the phenol or the phenol and the nitrogen compound are contacted with the aforesaid HCl-formaldehyde bath while maintaining the bath ratio at at least 8, preferably at least 10. The critical feature of the present invention is that an HCl-formaldehyde aqueous solution containing HCl in a fairly high concentration and formaldehyde in excess of the phenol or the phenol and the nitrogen-containing compound is contacted with the phenol or both the phenol and the nitrogen-containing compound at a bath ratio of as high as at least 8, preferably at least 10.

Since the process of this invention is carried out while the concentration of each of hydrochloric acid and formaldehyde is kept at at least 3% by weight, and the bath ratio, at not less than 8, the weight percentage of hydrochloric acid or formaldehyde based on the weight of the phenol or the total weight of the phenol and the nitrogen-containing compound is at least 24% by weight. Furthermore, since in the process of this invention, the total concentration of hydrochloric acid and formaldehyde is at least 10% by weight, the total weight of hydrochloric acid and formaldehyde based on the weight of the phenol or the total weight of the phenol and the nitrogen-containing compound is at least 80% by weight. These reaction conditions are fundamentally different from the reaction conditions for the production of known novolak and resol resins described hereinabove.

The concentration of hydrochloric acid (HCl) in the HCl-formaldehyde bath used in this invention is 8 to 25% by weight, preferably 12 to 22% by weight, and the concentration of formaldehyde (HCHO) in the bath is 5 to 20% by weight, preferably 7 to 15% by weight. The total concentration of HCl and formaldehyde in the bath is 15 to 35% by weight, preferably 20 to 32% by weight.

When the phenol alone is to be contacted with the HCl-formaldehyde bath, it is preferred to adjust the concentration of HCl in the bath to 10 to 25% by weight, especially 15 to 22% by weight, and the total concentration of HCl and formaldehyde in the bath, to 20 to 35% by weight, especially 25 to 32% by weight.

When the phenol or the phenol and the nitrogen-containing compound are to be contacted with the HCl-formaldehyde bath, the bath ratio (as defined hereinabove) is preferably at least 10, especially preferably 15 to 40.

In the process of this invention, the phenol or the phenol and the nitrogen-containing compound are contacted with the HCl-formaldehyde bath such that after contacting of the phenol with the bath, white suspended particles are formed and thereafter developed into a granular or powdery solid (preferably into a pink-colored granular or powdery solid when the nitrogen-containing compound is used). The contacting of the phenol and the nitrogen-containing compound with the HCl-formaldehyde bath is conveniently carried out such that by adding the phenol and the nitrogen-containing compound together to the HCl-formaldehyde bath or first adding the nitrogen-containing compound and then the phenol to the bath, a clear solution is first formed and then white suspended particles are formed and thereafter developed into a granular or powdery solid. In contacting the bath with the phenol or the phenol and the nitrogen-containing compound, it is preferred that before the white suspended particles are formed by the addition of the phenol, the bath be stirred to form a clear, preferably uniform, solution of the phenol or the phenol and the nitrogen-containing compound, and that after the formation of the white suspended particles until the suspended particles change to a solid, the bath (reaction mixture) be not subjected to a mechanical shearing force such as stirring depending upon the ratio of the phenol to the nitrogen-containing compound or the reaction conditions.

The phenol may be added as such, but if desired, it may be diluted with formalin, an aqueous solution of hydrochloric acid, water, etc. prior to the addition. It is preferred to use the phenol or the phenol and the nitrogen-containing compound after diluting it with a form-aldehyde solution having a formaldehyde concentration of not more than 44% by weight, preferably 3 to 44% by weight, more preferably 20 to 40% by weight. When the phenol alone is used, the diluted phenol solution preferably contains 50 to 95% by weight, especially 70 to 90% by weight, of the phenol. When the phenol and the nitrogen-containing compound are used, the concentration of these compounds differs greatly with the type of the phenol or the type of the nitrogen-containing compound and the ratio of the two compounds, but is usually 10 to 95% by weight. When only the diluted phenol is used, the concentration of the phenol in the dilution is especially preferably 70 to 90%. When both the phenol and the nitrogen compound are diluted, the total concentration of these compounds in the diluted solution is especially preferably 25 to 70% by weight. It is necessary however in this case to control the composition of the bath after the diluted solution has been added to the HCl-formaldehyde bath so as to satisfy the aforesaid requirements (a), (b) and (c), preferably the requirements (a), (b), (c) and (d).

The temperature of the HCl-formaldehyde bath to which the phenol, or the phenol and the nitrogen-containing compound, or the diluted solution thereof is to be added, or the temperature of the HCl-formaldehyde bath in which the nitrogen-containing compound has been dissolved is not more than 40° C., preferably 5° to 35° C., especially preferably 10° to 30° C.

Some embodiments of the process of this invention are described below.

EMBODIMENT 1

Embodiment 1 is a process which comprises maintaining the HCl-formaldehyde bath at a temperature of not more than 40° C., adding a phenol, optionally diluted with water or the aforesaid aqueous solution of formaldehyde (in the case of using the phenol alone), or a solution of the nitrogen-containing compound in the phenol kept at a temperature above its melting point or a diluted solution of these materials (in the case of using the phenol and the nitrogen-containing compound) to the bath to form a clear solution, forming white suspended particles in the clear solution, and thereafter developing them into a granular or powdery phenol-aldehyde resin.

In embodiment 1, it is especially advantageous that the phenol, or the phenol and the nitrogen-containing compound, either as such or as a diluted solution is added to the HCl-formaldehyde bath to form a uniform solution. A granular or powdery solid having a very small average particle diameter can be formed by forming white suspended particles in such a uniform solution, and controlling the solution such that a finely divided solid (a pink-colored finely divided solid in the case of not using the nitrogen-containing compound) is formed.

The formation of a uniform solution by adding the phenol or the phenol and the nitrogen-containing compound, either as such or as a diluted solution to the HCl-formaldehyde bath is preferably carried out by stirring the mixture. Preferably, this stirring operation is stopped before the formation of the white suspended particles, or as rapidly as possible when the formation of the white suspended particles begins. If the stirring is continued after the formation of the white suspended particles, the white suspended particles would frequently gather to form a sticky paste-like mass, and the proportion of the fine particles obtained would be reduced correspondingly.

When the temperature of the HCl-formaldehyde bath to which the phenol or the phenol and the nitrogen-containing compound or the diluted solution thereof is to be added is as low as not more than 10° C., especially not more than 5° C., and these materials are added all at a time to the bath, a uniform solution can be formed by continuously stirring the mixture. Since, however, the rate of the reaction of the phenol or the phenol and the nitrogen-containing compound with formaldehyde becomes lower as the temperature of the bath becomes lower, long periods of time are required until white suspended particles are formed, and the time required for the resulting white suspended particles to grow into a stable granular or powdery solid becomes correspondingly longer. Hence, if the stirring is stopped after the formation of the white suspended particles, the white suspended particles settle to the bottom of the bath before they grow into stable particles, and the condensation reaction between the phenol optionally together with the nitrogen-containing compound and formaldehyde proceeds while the suspended particles are settled and accumulated in this way. Consequently, a sticky paste-like mass or a plate-like lumpy solid results, and the amount of the desired granular or powdery product is correspondingly decreased.

For the foregoing reasons, it is preferred to maintain the HCl-formaldehyde bath at a temperature of 5° to 35° C., especially 10° to 35° C., add the phenol or the phenol and the nitrogen-containing compound or the diluted solution thereof to the bath maintained at this temperature, and to maintain the temperature of the reaction system at not more than 45° C. until the desired granular or powdery product is formed. The temperature of the reaction system can be easily maintained at not more than 45° C. by adjusting the temperature outside the reaction system to not more than 35° C., especially to 5° to 25° C. By this procedure, a uniform solution can be formed batchwise by adding required amounts of the phenol or the phenol and the nitrogen-containing compounds all at a time to the bath, and then white suspended particles can be formed and developed smoothly into a fine granular or powdery solid. Since the reaction of the phenol or the phenol and the nitrogen-containing compound with the HCl-formaldehyde bath in this invention is a relatively mild exothermic reaction, the desired reaction can be carried out under the aforesaid conditions without involving the sedimentation and accumulation of the white suspended particles even when no particular heating by an external heating source is effected.

In the process of embodiment 1, when the white suspended particles are formed, they turn milk-white with the lapse of time, and usually the entire reaction mixture in the bath becomes fairly deep milk-white. Thereafter, it turns white to pink depending upon the proportions of the phenol and the nitrogen-containing compound.

The white suspended particles, which are formed in accordance with the process of embodiment 1 after first forming a uniform solution by adding the phenol, or the phenol and the nitrogen-containing compound, or the diluted solution thereof to the HCl-formaldehyde bath maintained at 5° to 35° C., especially 10° to 35° C., may be converted to a granular or powdery solid without particularly heating them by an external heat source, or if desired after cooling them. Or they may be converted to the desired granular or powdery solid after heating them by an external heating source.

As stated above, when after the formation of white suspended particles in the bath, the white suspended particles are maintained in the bath with or without temperature elevation, they turn milk-white and finally grow into a granular or powdery solid. The exothermic reaction substantially ceases at some point in this stage. Since at this point the granular or powdery solid is stable, it is permissible to stir the bath again. Alternatively, when the phenol and the nitrogen-containing compound are used, after this stable state has been reached, one may filter the bath to separate the granular or powdery solid, and put the separated solid in another HCl-formaldehyde bath (to be referred to as a second bath) preferably meeting the requirements (a), (b) and (c) specified hereinabove to complete the desired reaction. The second bath may have a lower formaldehyde concentration and/or HCl concentration than the HCl-formaldehyde bath (to be referred to as a first bath) to which the phenol and the nitrogen-containing compound or the diluted solution thereof are first added. Since the granular or powdery solid to be added to the second bath contains only a very small amount of free phenol or contains substantially no free phenol, the bath ratio of the second bath to the solid added does not have to be at least 8 as in the first bath, and may be less than 8.

When in accordance with embodiment 1 an HCl-formaldehyde bath of selected concentrations is maintained at 15° to 35° C. and a diluted solution of the phenol or a diluted solution of the phenol and the nitrogen-containing compound in specified proportions is added to the bath, the initial-stage condensate settles as white suspended particles and before adhering to the reactor, etc., grow into a thermally stable fine granular or powdery solid within very short periods of time. In this case, therefore, a shearing force such as stirring may be exerted at the time of the formation of the white suspended particles.

The granular or powdery solid obtained by completing the desired reaction at a temperature of not more than 45° C. after the formation of the white suspended particles has not undergone sufficient curing reaction, and therefore generally shows heat fusibility in a heat fusibility test at 100° C. to be described hereinbelow.

EMBODIMENT 2

This embodiment is applied when both the phenol and the nitrogen-containing compound are used. The process according to embodiment 2 is advantageously performed by maintaining an HCl-formaldehyde bath having the nitrogen-containing compound dissolved therein in advance at a temperature of not more than 40° C., preferably 5° to 35° C., especially preferably 10° to 30° C., adding a phenol at a temperature above its melting point, or a solution of the nitrogen-containing compound in the phenol at a temperature above its melting point, or a diluted solution of the phenol or these reactant materials, preferably the diluted solution of the phenol, to the bath, and maintaining the temperature of the reaction system at not more than 45° C. until the desired granular or powdery product is formed. Otherwise, the operation is substantially the same as that in embodiment 1. Since the nitrogen-containing compound added in advance to the HCl-formaldehyde bath tends to induce polycondensation of the aldehyde in the system, it is desired to add the phenol to the bath within a short period of time after dissolving the nitrogen-containing compound in the bath.

Examples of the phenol used in this invention include phenol, m-cresol, o-cresol, p-cresol, bisphenol-A, bisphenols, o-, m- or p-($C_2$–$C_4$ alkyl)phenols, p-phenylphenol, xylenol, resorcinol and hydroquinone. Materials containing these phenols as main ingredients such as cashew nutshell liquid can equally be used as the phenol in this invention. Of these, phenol, m-cresol, and mixtures of phenol with the other phenols are preferred. These phenol mixtures preferably contain at least 50% by weight, especially at least 65% by weight, of phenol.

Phenol, m-cresol, and a mixture of phenol and resorcinol are especially preferred in this invention since they have good reactivity with the nitrogen-containing compound or the aldehydes and therefore the efficiency of production of the resin of this invention is high. When the nitrogen-containing compound is not used, phenol or mixtures of phenol with the other phenols (preferably containing at least 80% by weight, especially at least 85% by weight, of phenol) are especially preferred in this invention.

The nitrogen containing compound used in this invention is a compound containing at least two active hydrogens in the molecule. Preferably, it contains in the molecule at least one group having active hydrogens selected from the class consisting of amino groups, amide groups, thioamide groups, ureylene groups and thioureylene groups. Examples of such nitrogen-containing compound are urea, thiourea, methylol derivatives of urea or thiourea, aniline, melamine, guanidine, guanamide, dicyandiamide, fatty acid amides, polyamides, toluidine, cyanuric acid, and functional derivatives of these compounds. They may be used either singly or as a mixture of two or more.

Of these nitrogen-containing compounds, urea, thiourea, methylol derivatives of these (e.g., N,N-dimethylolurea, N,N'-dimethylolurea and N,N-dimethylolthiourea), aniline, melamine, guanidine, guanamine and dicyandiamide are preferred. These nitrogen-containing compounds have good reactivity with the phenol or the aldehyde, and give a granular or powdery resin in the form of fine particles with a relatively uniform shape.

Urea is especially suitably used in this invention because it is easy to handle as a material and gives a white fine granular or powdery resin having excellent quality.

Suitable formaldehyde supply sources for the HCl-formaldehyde bath include formalin, trioxane, tetraoxane and para-formaldehyde.

The HCl-formaldehyde bath used in this invention may include up to 10% by weight of an aldehyde other than formaldehyde in addition to the aforesaid formaldehyde supply sources. Examples of suitable other aldehydes are monofunctional aliphatic aldehydes having 2 to 4 carbon atoms, glyoxal, furfural and benzaldehyde. Examples of the monofunctional aliphatic aldehydes include acetaldehyde, propionaldehyde, n-butyl aldehyde and iso-butyl aldehyde. These aldehydes may be used singly or as a mixture of two or more.

The other aldehydes are frequently used to retard the rate of reaction and make it easy to control the reaction because the reaction in accordance with this invention involving the nitrogen-containing compound proceeds much more rapidly than in the absence of the nitrogen-containing compound.

The other aldehyde may also be included in the matrix forming the resin of this invention. Such a resin frequently has excellent affinity for rubber, or possesses higher oil resistance and electrical properties.

According to the most preferred embodiment of this invention, the aldehyde is substantially formaldehyde, and the phenol is substantially phenol, and furthermore when the nitrogen-containing compound is used, it is substantially urea or melamine.

In the process of this invention, the phenol and the nitrogen-containing compound are used in such amounts that the proportion of the nitrogen-containing compound is preferably 5 to 75% by weight, more preferably 15 to 65% by weight, especially preferably 25 to 55% by weight, based on the total weight of the two compounds. When the nitrogen-containing compound is used in a proportion of b 5 to 75% by weight as described above, there can be obtained a granular or powdery resin having excellent heat resistance, thermal insulation, water resistance, alkali resistance, arc resistance and mechanical properties.

The granular or powdery phenol-aldehyde resin solid obtained by the above procedure after completing the desired reaction may be worked up into a final desired product by separating it from the HCl-formaldehyde bath and washing it with water, and preferably neutralizing the adhering hydrochloric acid with an aqueous alkaline solution and further washing the product.

Thus, the process of this invention has the advantage that the granular or powdery resin can be produced in a weight far exceeding the weight of the phenol used or the total weight of the phenol and the nitrogen-containing compound used.

Aqueous solutions of alkali metals, or an aqueous solution of ammonia, particularly the latter may be used preferably as the aqueous alkaline solutin. The suitable concentration of ammonia in such a solution is 0.1 to 5% by weight, especially 0.3 to 3% by weight. Advantageously, the neutralization with the aqueous alkaline solution is carried out at a temperature of not more than 50° C., preferably 10° to 40° C.

The granular or powdery solid obtained after the above washing treatment with or without the subsequent neutralization and washing may be dehydrated and offered directly for end uses. Or it may be offered for end uses after drying it in a customary manner at a temperature lower than its heat-fusion temperature, for example at 40° to 50° C. Or before or after the drying, it may be pulverized lightly by any desired pulverizing machine. Or a product having a predetermined particle size distribution may be obtained by using a classifier.

GRANULAR OR POWDERY RESIN

According to this invention, there is obtained a granular or powdery phenol-aldehyde resin which is a condensation product of a phenol and an aldehyde and optionally a nitrogen-containing compound having at least two active hydrogens. This granular or powdery resin is characterized by (A) containing spherical primary particles and secondary particles resulting from the agglomeration of the primary particles, each of said particles having a particle diameter of 0.1 to 150 microns, (B) having such a size that at least 50% by weight thereof can pass through a 100 Tyler mesh sieve, (C) having a free phenol content, determined by liquid chromatography, of not more than 500 ppm, and (D) having a methanol solubility, S defined by the following equation, of more than 20% by weight $$S = \frac{W_o - W_1}{W_o} \times 100(\%)$$

wherein $W_o$ is the weight in grams of the resin, and $W_1$ is the weight in grams of the resin left after heating under reflux, when about 10 g of the resin is heated under reflux in 500 ml of substantially anhydrous methanol.

The granular or powdery resin of this invention may also be defined by the ratio of the absorption intensity of an absorption peak assigned to the aromatic double bond to that of an absorption peak assigned to the methylol group in its infrared absorption spectrum. The positions of the two peaks and their absorption intensities differ somewhat depending upon the presence or absence of the nitrogen-containing compound.

The granular or powdery resin substantially free from the nitrogen-containing compound has a $D_{990-1015}/D_{1600}$ ratio of from 9.2 to 9.0 in its infrared absorption spectrum determined by a KBr tablet method, wherein $D_{1600}$ represents the absorption intensity of an absorption peak at 1600 cm$^{-1}$ (the peak assigned to benzene) and $D_{990-1015}$ represents the highest absorption intensity of absorption peaks in the range of 990 to 1015 cm$^{-1}$ (the peaks assigned to the methylol groups). This resin further has a $D_{890}/D_{1600}$ ratio, wherein $D_{890}$ represents the absorption intensity of a peak at 890 cm$^{-1}$ (the peak assigned to a lone hydrogen atom on the benzene ring), of from 0.09 to 1.0.

The granular or powdery resin containing the nitrogen-containing compound has a $D_{960-1020}/D_{1450-1500}$ ratio of from 0.1 to 2.0 in its infrared absorption spectrum measured by a KBr tablet method, wherein $D_{1450-1500}$ represents the highest absorption intensity of absorption peaks in the range of 1450 to 1500 cm$^{-1}$ (the peaks assigned to the aromatic double bond) and $D_{960-1020}$ represents the highest absorption intensity of absorption peaks in the range of 960 to 1020 cm$^{-1}$ (the peaks assigned to the methylol groups), and preferably further has a $D_{1280-1360}/D_{1450-1500}$ ratio of 0.15 to 3.0 in the infrared absorption spectrum, wherein $D_{1280-1360}$ represents the highest absorption intensity of absorption peaks in the range of 1280 to 1360 cm$^{-1}$ (the peaks assigned to the carbon-nitrogen bond).

The limitations (A) to (F) of the granular or powdery phenol-aldehyde resin of the invention (to be sometimes referred to as the product of this invention) are measured by the methods to be described hereinbelow.

A first feature of the product of the invention is that it consists mostly of spherical primary particles and secondary particles resulting from the agglomeration of the primary particles, each having a particle diameter of 0.1 to 150 microns, preferably 0.1 to 100 microns as specified in (A) above and is quite different from a forcibly pulverized product of a cured product of a known novolak or resol resin or a pulverization product of known cured novolak fibers. This fact is clearly demonstrated by the optical and scanning electron microphotographs attached to this application as FIGS. 1A, 1B, 2A and 2B.

The granular or powdery resin of this invention containing the nitrogen-containing compound generally has a smaller particle diameter and consists of spherical primary particles and secondary particles resulting from the agglomeration of the primary particles, each of which has a particle diameter of 0.1 to 100 microns, preferably 0.1 to 50 microns. This fact is clearly demonstrated by scanning electron microphotographs attached to this application as FIGS. 4A, 4B, 5A, 5B, 6A and 6B.

As shown in FIGS. 1 and 2, at least 30%, preferably at least 50%, of the granular or powdery resin product of this invention consists of spherical primary particles and secondary agglomerated particles having a particle diameter of 0.1 to 150 microns, preferably 0.1 to 100 microns. In the case of the granular or powdery resin of this invention containing the nitrogen-containing compound, usually at least 30%, preferably at least 50%, thereof consists of spherical primary particles and secondary particles resulting from the agglomeration of the primary particles, each of which has a particle diameter of 0.1 to 100 microns, preferably 0.1 to 50microns, as shown in FIGS. 4 to 6. The expression 30% or 50% means that as defined in the description of the method for measuring the particle diameter given hereinbelow, it is 30% or 50% based on the number of entire particles (including the secondary agglomerated particles) of the resin in one visual field of an optical microscope having a magnification of 100 to 1,000 or a scanning electron microscope having a magnification of 500 to 5,000. It is preferred that 70% to substantially 100% of the granular or powdery product of the invention consist of spherical primary particles and secondary agglomerated particles each having a particle diameter of 0.1 to 150 microns (0.1 to 100 microns in the case of the resin containing the nitrogen-containing compound). Especially preferably, at least 30%, especially at least 50%, of the number (as an average of those in five visual fields) of particles in the visual field of a microphotograph in accordance with the above definition consists of spherical primary particles and secondary agglomerated particles having a particle diameter in the range of 0.1 to 100 microns, preferably 0.1 to 50 microns, (in the case of the resin containing the nitrogen-containing compound, 0.1 to 50 microns, preferably 0.1 to 20 microns).

That the individual particles of the granular or powdery resin product of this invention are composed of spherical primary particles and secondary agglomerated particles each having a very small particle diameter is presumably because the process of this invention involves adding the phenol or the phenol and the nitrogen-containing compound (or the diluted solution thereof) to the HCl-formaldehyde bath to form a uniform solution at least partly, then forming very small white suspended particles in the solution, and developing the white suspended particles into stable granular or powdery particles which have undergone curing reaction to some extent.

Since the granular or powdery resin product of this invention is formed mainly of the minute spherical primary particles and the secondary agglomerated particles thereof, it is veyr small in size as specified in (B) above. Thus, at least 50% by weight, preferably at least 70% by weight, especially preferably at least 80% by weight, of the entire resin passes through a 100 Tyler mesh sieve (a 150 Tyler mesh sieve in the case of the resin containing the nitrogen-containing compound). The expression "passing through the sieve" does not exclude the exertion of a force which does not cause forcible destruction of the particles (including the secondary agglomerated particles) in the procedure of screening the granular or powdery product through the sieve, for example light crumpling of the granular or powdery product by hand, light pushing or levelling of the paticles on the mesh by means of a brush or light tapping of the particles by hand because the particles of the granular or powder resin of this invention become agglomerated as their average particle size becomes smaller.

As specified in (C) above, the granular or powdery product of the invention has a free phenol content, determined by liquid chromatography, of not more than 500 ppm. The preferred free phenol content is not more than 250 ppm, above all not more than 100 ppm, for the resin containing the nitrogen-containing compound, and above 50 ppm but not more than 400 ppm, especially above 50 ppm but not more than 300 ppm. That the product of the invention has a very low free phenol content is also presumably because the process of the invention comprises adding the phenol, or the phenol and the nitrogen-containing compound or the diluted solution thereof to the HCl-formaldehyde bath to form a uniform solution at least partly, then forming very fine white suspended particles and developing them into stable fine particles, and therefore, substantially all of the phenol added, especially the phenol which participates in the formation of the product of the invention, reacts with the aldehyde present in large excess. The granular or powdery products obtained by the methods disclosed in Japanese Patent Publication No. 42077/1978 cited above has a free phenol content of as high as 0.3 to about 6% by weight. In contrast, the free phenol content of the granular or powdery product of the invention is quite small, and this fact is an important advantage of granular or powdery products of this kind and is very surprising.

Furthermore, as specified by (D),the granular or powdery resin product of this invention has such a characteristis that its solubility in methanol exceeds 20% by weight, preferably at least 30% by weight, especially preferably at least 40% by weight. This characteristics shows that the product of this invention contains a large amount of a relatively low-molecular-weight condensate soluble in methanol.

The granular or powdery product of this invention substantially free from the nitrogen-containing compound has a $D_{990-1015}/D_{1600}$ ratio of from 0.2 to 9.0, and a $D_{890}/D_{1600}$ ratio of from 0.09 to 1.0 in its infrared absorption spectrum, as specified in (E) above. Preferably, the $D_{990-1015}/D_{1600}$ ratio is from 0.2 to 5.0, especially from 0.3 to 4.0, and the $D_{890}/D_{1600}$ ratio is from 0.1 to 0.9, especially 0.12 to 0.8.

It is widely known with regard to phenol-formaldehyde resins that in their infrared absorption spectra, the peak at 1600 cm$^{-1}$ shows an absorption assigned to the benzene ring, the peaks at 990 to 1015 cm$^{-1}$ show absorptions assigned to the methylol groups, and the peak at 890 cm$^{-1}$ shows an absorption assigned to a lone hydrogen atom on the benzene ring.

Furthermore, as specified in (F) above, the granular or powdery product of this invention containing the nitrogen-containing compound has a $D_{960-1020}/D_{1450-1500}$ ratio of from 0.1 to 2.0, and preferably further has a $D_{1280-1360}/D_{1450-1500}$ ratio of from 0.15 to 3.0.

Preferably, this product has a $D_{960-1020}/D_{1450-1500}$ ratio of from 0.15 to 0.6 and further a $D_{1250-1360}/D_{1450-1500}$ ratio of from 0.2 to 1.5. Especially preferably it has a $D_{960-1020}/D_{1450-1500}$ ratio of from 0.2 to 0.4, and further a $D_{1280-1360}/D_{1450-1500}$ ratio of from 0.3 to 1.0.

The product of this invention further has such a characteristic in its infrared absorption spectrum determined by a KBr tablet method that it has a $D_{1580-1650}/D_{1450-1500}$ ratio of from 0.3 to 3.0, preferably from 0.75 to 2.0, especially preferably from 1.0 to 1.5, wherein $D_{1580-1650}$ represents the highest absorption intensity of absorptin peaks in the range of 1590 to 1650 cm$^{-1}$.

Generally, it is difficult to determine the assignment of various functional groups of a substance having a three-dimensional crosslinked structure by an infrared absorption spectroscopic method because peaks in its infrared absorption spectral chart frequently shift greatly. But from the infrared absorption spectra of the phenol-aldehyde resin and various nitrogen-containing compounds, it has been determined that in the infrared absorption spectrum of the resin of this invention, the absorption peaks at 960 to 1020 cm$^{-1}$ are assigned to the methylol groups, the absorption peaks at 1280 to 1360 cm$^{-1}$ are assigned to the carbon-nitrogen bond, and the absorption peaks at 1450 to 1500 cm$^{-1}$ are assigned to the aromatic double bond.

The definite assignment of the absorptions at 1580 to 1650 cm$^{-1}$ is difficult. But since the $D_{1580-1650}/D_{1450-1500}$ ratio using the highest absorption intensity of the peaks at 1580 to 1650 cm$^{-1}$ can clearly distinguish from the same ratio in a nitrogen-free phenol-formaldehyde resin, these absorptions can be recognized as characteristic absorptions for identifying the resin of this invention containing the nitrogen-containing compound.

It is understood that the ratio of absorption intensities in the infrared absorption spectrum of the product of this invention, for example $D_{990-1015}D_{1600}=0.2-9.0$ or $D_{960-1020}/D_{1450-1500}=0.1-2.0$ which is one parameter for specifying the product of this invention, is a value associated with its structure and shows that the product of this invention contains a considerable amount of the methylol groups and the methylol group content can be adjusted within a certain range.

The granular or powdery resin product is characterized by having the characteristics (A) to (D) described hereinabove.

The preferred product of this invention having a $D_{990-1015}/D_{1600}$ ratio of from 0.2 to 5.0, or a $D_{960-1020}/D_{1450-1500}$ ratio of from 0.15 to 0.6, and above all a $D_{990-1015}/D_{1600}$ ratio of from 0.3 to 4.0 or a $D_{960-1020}/D_{1450-1500}$ ratio of from 0.2 to 0.4 contain methylol groups in a moderate degree of concentration and is stabler.

The fact that in its infrared absorption spectrum the product of this invention has a $D_{890}/D_{1600}$ ratio of from 0.09 to 1.0, preferably from 0.1 to 0.9, above all from 0.12 to 0.8, shows that in the product of this invention, the reaction sites (the ortho- and parapositions) of phenol molecules which participated in the reaction are moderately blocked by methylol groups.

Generally, one or both of the $D_{990-1015}/D_{1600}$ ratio and the $D_{890}/D_{1600}$ ratio of a cured product of a known resol resin are lower than those of the product of this invention. A cured product of a known novolak resin cured with hexamine has a $D_{890}/D_{1500}$ ratio which is generally lower than the lower limit of this ratio of the product of this invention.

The granular or powdery resin product of this invention is characteized by the aforesaid characteistics (A) to (E).

The granular or powdery resin product of this invention is very fine in size and has very good flowability because it contains spherical primary particles and secondary agglomerated particles each having a particle diameter of 0.1 to 150 microns, preferably 0.1 to 100 microns [characteristic (A)] preferably in a proportion of at least 30%, and at least 50% by weight, preferably at least 70% by weight, of these particles can pass through a 100 Tyler mesh sieve [characteristic (B)]. It can be mixed in a relatively large amount with another resin, and the resulting mixture, when used as an injection molding material, can be smoothly extruded without blocking up nozzles. Since many of the particulate products of the invention contain very minute spherical primary particles as a basic constituent element, cured molded articles prepared from these products as fillers show superior mechanical properties, particularly high resistance to compression. Furthermore, the granular or powdeyr resin product of this invention is very stable at ordinary temperature. Moreover, since it contains a considerable amount of methylol groups, it has reactivity in the heated state. It exhibits reactivity when it is molded and heat-cured either singly or together with another molding material such as resol resins, other resins and rubbers. Hence, it can be molded into articles having superior physical and mechanical properties, thermal insulation, heat resistance and electrical properties, especially heat resistance.

Since the granular or powdery resin of this invention has a free phenol content of not more than 500 ppm [characteristic (C)], it is safe and very easy to handle. Accordingly, even when it is used as a binder, etc. In the formation of paper-like sheets of asbestos or synthetic resins or in the production of nonwoven fabrics, not only the resulting products but also the waste liquors contain only a very small amount of free phenol, and do not cause pollution. Furthermore, when it is molded in admixture with another resin, no side-reaction attributed to phenol takes place, and no deterioration in property due to free phenol occurs in the molded articles.

The granular or powdery resin of the invention can be obtained as a resin whose curing reaction has not fully proceeded. Hence, when hot-pressed for 5 minuets at 100° C. in accordance with the method of measuring heat fusibility to be described hereinbelow, the granular or powdery resin of the invention becomes a lumpy or platelike product as a result of substantial melting or melt-adhesion.

It has been found by elemental analysis that the granular or powdery resin of this invention which is substantially free from the nitrogen-containing compound is composed of carbon, hydrogen and oxygen and has the following composition.

C: 70 to 80% by weight
H: 5 to 7% by weight
O: 17 to 21% by weight
(Total 100% by weight)

It has also been found that many of the granular or powdery resins of this invention which contain the nitrogen-containing compound contain at least 1% by weight, preferably 2 to 30% by weight of nitrogen.

As can be seen from the process of this invention, the granular or powdery resin of this invention has excellent heat resistance, and does not substantially contain a hydrophilic polymeric compound. Accordingly, when it is molded and heat-cured either alone or in combination with another resin or a rubber, there is no likelihood of deteriorating the properties of the molded articles by such compounds.

As stated hereinabove, the granular or powdery phenol-aldehyde resin product of the invention is very fine, has good storage stability, excellent flow characteristics and a very low free phenol content, and contains some amounts of methylol groups optionally together with nitrogen. Hence, it has the excellent advantage of having reactivity, and giving a product having excellent heat resistance when molded and heated either singly or together with another resin or a rubber.

The following examples illustrate the present invention more specifically. The various data given in these examples were measured by the following methods.

1. content of particles having a paticle size of 0.1 to 150μ:

A portion weighing about 0.1 g was sampled from five different sites of one sample.

A part of each of the 0.1g portions so sampled was placed on a slide glass for microscopic examination. The sample on the slide glass was spread to minimize accumulation of particles for easy observation.

The microscopic observation was made with regard to that part of the sample in which about 10 to about 50 primary particles and/or the secondary agglomerated particles thereof were present in the visual field of an optical microscope usually having a magnification of 100 to 1,000. The sizes of all particles existing in the visual field of the optical microscope were read by a measure set in the visual field of the optical microscope and recorded.

The content (%) of particles having a size of 0.1 to 150μ can be calculated in accordance with the following equation.

$$\text{Content (\%)} = \frac{N_1}{N_o} \times 100$$

$N_o$: the total number of particles whose size were read in the visual field under the microscope, and
$N_1$: the number of those particles in $N_o$ which had a size of 0.1 to 150μ.

For each sample, the average of values obtained from the five sampled portions was calculated.

2. Proportion of particles which passed through a Tyler mesh sieve:

Above 10 g of a dried sample, if desired after being lightly crumpled by hand, was accurately weighed. Over the course of 5 minutes, the sample was put little by little in a Tyler mesh sieve vibrator (the opening size of the sieve 200 mm in diameter; vibrating speed 200 rpm). After the end of addition, the sieve was vibrated further for 10 minutes. The proportion of the particles which passed through a 100 Tyler mesh sieve, for example, was calculated from the following equation.

$$\text{Proportion (\% by weight)} = \frac{\omega_o - \omega_1}{\omega_o} \times 100$$

$\omega_o$: the amount of the sample put in the sieve (g),
$\omega_1$: the amount of the sample which remained on the 100 Tyler mesh sieve (g).

3. Free phenol content:

About 10 g of the sample which passed through the 100 Tyler mesh sieve was precisely weighed, and heat-treated under reflux for 30 minutes in 190 g of 100% methanol. The heat-treated product was filtered through a No. 3 glass filter. The filtrate was subjected to high-performance liquid chromatography to determine the phenol content of the filtrate. The free phenol content of the sample was determined from a calibration curve separately prepared.

The operating conditions of high-performance liquid chromatography were as follows:

Device: Model 6000 A made by Waters Co., U.S.A.
Column carrier: μ-Bondapak $C_{18}$
Column: ¼ inch in diameter and 1 foot in length
Column temperature: room temperature
Eluent: methanol/water (3/7 by volume)
Flow rate: 0.5 ml/min.
Detector: UV (254 nm), range 0.01 (1 mV)

The phenol content of the filtrate was determined from a separately prepared calibration curve (showing the relation between the phenol content and the height of a peak based on phenol).

4. Infrared absorption spectrum and absorption intensities:

The infrared absorption spectrum of a sample prepared by a usual KBr tablet method was measured by means of an infrared spectrophotometer (Model 225 made by Hitachi Limited).

The absorption intensity at a specified wavelength was determined in the following way.

A base line is drawn tangent to a peak whose absorption intensity is to be determined in the measured infrared absorption spectral chart. Let the transmittance of the vertex of the peak be $t_p$ and the transmittance of the base line at the specified wavelength be $t_b$, then the absorption intensity D at the specified wavelength is given by the following equation.

$$D = \log \frac{t_b}{t_p}$$

Accordingly, the ratio of the absorption intensity of a peak at 960 to 1020 cm$^{-1}$ to that of a peak at 1450 to 1500 cm$^{-1}$ is given by the ratio of the respective absorption intensities determined by the above equation (i.e., $D_{960-1020}/D_{1450-1500}$).

5. Heat resistance test:

Square receptacles made of a 300-mesh wire gauze with each side measuring 5 cm were each filled with 25 g of a sample, and left to stand for 8 hours in an air dryer at 200° C. The temperatures of the central portions of the samples were measured by a thermocouple thermometer, and the maximum temperature reached was determined and defined as heat resistance.

6. Heat fusibility at 100° C.:

About 5 g of a sample which passed through a 100 Tyler mesh sieve was interposed between two 0.2 mm-thick stainless steel sheets, and the assembly was pressed under an initial pressure of 50 kg for 5 minutes by means of a hot press kept at 100° C. (a single acting compression molding machine manufactured by Shinto Kinzoku Kogyosho Co., Ltd.). The press was released, and the hot pressed sample was taken out from between the two stainless steel sheets, and observed. When the sample so taken out was in the form of a flat plate as a result of melting or melt-adhesion, it was judged that the sample had fusibility. When no appreciable difference was noted after the hot pressing, the sample was determined to have infusibility.

7. Methanol solubility:

About 10 g of a sample was precisely weighed (the precisely measured weight is given by $W_o$), and heat-treated under reflux for 30 minutes in about 500 ml of 100% methanol. The mixture was filtered on a No. 3 glass filter. The sample remaining on the filter was washed with about 100 ml of methanol. Then, the sample remaining on the filter was dried at 70° C. for 2 hours. The weight of the dried sample was precisely weighed (the precisely measured weight is given by $W_l$). The solubility of the sample in methanol was calculated from the following equation.

$$\text{Solubility in methanol (\%)} = \frac{W_o - W_1}{W_o} \times 100$$

8. Bulk density:

A sample was poured into a 100 ml measuring cylinder (whose brim corresponded to a 150 ml indicator mark) from a height 2 cm above the brim of the measuring cylinder. The bulk density of the sample is defined by the following equation.

$$\text{Bulk density (g/ml)} = \frac{W(g)}{100 \text{ (ml)}}$$

W: the weight in grams of the sample per 100 ml.

9. Hydroxyl value:

Measured in accordance with the method of measuring the hydroxyl value (General Testing Method 377, Commentary on the Standards of Cosmetic Materials, first edition, published by Yakuji Nipponsha, 1975, Japan).

EXAMPLE 1

(1) In each run, a 2-liter separable flask was charged with 1,500 g of a mixed aqueous solution at 28° C. of hydrochloric acid and formaldehyde having each of the compositions shown in Table 1, and 55.6 g of a 90% by weight aqueous solution of phenol at 22° C. prepared from 98% by weight of phenol (the remaining 2% by weight being water) and water was added. The mixture was stirred for 30 seconds, and then left to stand for 120 minutes. During the 120-minute standing, the contents of the flask remained clear (Run No. 1), or turned from a clear solution to a whitely turbid suspension (Runs Nos. 9, 18 and 20), or turned from a clear solution to a whitely turbid suspension which then turned pale pink (Runs Nos. 2 to 8, 10 to 17, and 19). Microscopic observation showed that the pink-colored suspensions already contained spherical particles, agglomerated spherical particles, and a small amount of a powder.

In these runs, the temperature of each reaction system gradually rose by the generation of heat (the temperature at peak 31.5° to 39.5° C.), and thereafter decreased. Each of the reaction products was washed with water, and then treated for 3 hours while it was slowly stirred in a 0.5% by weight aqueous ammonia solution at 22° C. The product was again washed with water, dehydrated, and dried at 40° C. for 5 hours. The properties of each of the resulting products are shown in Table 2.

(2) For comparison, the following experiment was carried out. A 1-liter separable flask was charged with 282 g of distilled phenol, 369 g of 37% by weight formalin and 150 g of 26% by weight aqueous ammonia and with stirring, the mixture was heated from room temperture to 70° C. over 60 minutes. Furthermore, the mixture was stirred at 70° to 72° C. for 90 minutes, and then allowed to cool. While 300 g of methanol was added little by little, the product was dehydrated by azeotropic distillation under a reduced pressure of 40 mmHg. As a solvent, 700 g of methanol was added, and the product ws withdrawn as a yellowish brown clear solution of a resol resin. The resin had a free phenol content of 3.4% by weight of liquid chromatography.

When the solvent was removed from a part of the resulting resol resin under reduced pressure, vigorous foaming occurred and the resin was gelled. The gel was heat-cured under a nitrogen gas atmosphere at 160° C. for 60 minutes, and the resulting cured foam was pulverized to obtain a small amount of a powder which passed through a 100 Tyler mesh sieve. The heat-cured resol was extremely difficult to pulverize into a powder having a size of 100-mesh under even when various types of pulverizers or ball mills or a vibratory mill for fluorescent X-rays were used. The resulting heat-cured cresol resin powder was treated with a 0.5% by weight aqueous ammonia solution, washed with water, dehydrated and then dried under the same conditions as described in section (1) above. The properties of the resulting product are shown in Table 2 as Run No. 21.

A 1-liter separable flask was charged with 390 g of phenol, 370 g of 37% by weight formalin, 1.5 g of oxalic acid and 390 g of water, and with stirring, the mixture was heated to 90° C. over 60 minutes and heated with stirring at 90° to 92° C. for 60 minutes. Then, 1.0 g of 35% by weight hydrochloric acid was added, and the mixture was further heated with stirring at 90° to 92° C. for 60 minutes. The product was cooled by adding 500 g of water, and then the water was removed by a siphon. The residue was heated under a reduced pressure of 30 mmHg, and heated under reduced pressure at 100° C. for 3 hours and then at 180° C. for 3 hours. On cooling, a novolak resin was obtained as a yellowish brown solid having a softening temperature of 78° to 80° C. and a free phenol content, measured by liquid chromatography, of 0.76% by weight. It has a methanol solubility of 100% by weight.

The resulting novolak resin was pulverized and mixed with 15% by weight of hexamethylenetetramine. The mixture was heat-cured in a nitrogen gas at 160° C. for 120 minutes, pulverized in a ball mill, and then passed through a 100 Tyler mesh sieve. The resulting powder was treated with a 0.5% by weight aqueous ammonia solution, washed with water, dehydrated and then dried under the same conditions as described above. The properties of the resulting product are shown in Table 2 was Run No. 22.

The novolak resin was melt-spun at 136° to 138° C. through a spinneret having 120 orifices with a diameter of 0.25 mm. The as-spun filaments having an average size of 2.1 denier were dipped in a mixed aqueous solution containing 18% by weight of hydrochloric acid and 18 by weight of formaldehyde at 20° to 21° C. for 60 minutes, heated to 97° C. over 5 hours, and then maintained at 97° to 98° C. for 10 hours. The resulting cured novolak fibers were treated with a 0.5% by weight aqueous ammonia solution, washed with water, dehydrated and then dried under the same conditions as described above. The product was pulverized in a ball mill, and passed through a 100 Tyler mesh sieve. The properties of the resulting product are shown in Table 2 as Run No. 23.

(3) Table 1 shows the concentrations of hydrochloric acid and formaldehyde used and the total concentration of hydrochloric acid and formaldehyde, and the mole ratio of formaldehyde to phenol. Table 2 shows the contents of particles having a size of 1 to 50 microns, 1 to 100 microns, and 1 to 150 microns respectively, the proportion of particles which passed through a 100 Tyler mesh sieve, and the $D_{990-1015}/D_{1600}$ and $D_{890}/D_{1600}$ ratios of the resulting products.

TABLE 1

| Run No. | Concentrations (wt. %) HCl | Formaldehyde | Total | Mole ratio of formaldehyde to phenol |
|---|---|---|---|---|
| 1 | 3 | 1 | 4 | 0.9 |
| 2 | 3 | 25 | 28 | 23.6 |
| 3 | 5 | 5 | 10 | 4.7 |
| 4 | 5 | 10 | 15 | 9.4 |
| 5 | 5 | 22 | 27 | 20.8 |
| 6 | 7 | 30 | 37 | 28.3 |
| 7 | 10 | 6 | 16 | 5.7 |
| 8 | 10 | 20 | 30 | 18.9 |
| 9 | 12 | 2 | 14 | 1.9 |
| 10 | 15 | 5 | 20 | 4.7 |
| 11 | 15 | 20 | 40 | 18.9 |
| 12 | 18 | 10 | 28 | 9.4 |
| 13 | 20 | 7 | 27 | 6.6 |
| 14 | 22 | 4 | 26 | 3.8 |
| 15 | 22 | 17 | 39 | 16.0 |
| 16 | 25 | 6 | 31 | 5.7 |

TABLE 1-continued

| Run No. | Concentrations (wt. %) HCl | Formaldehyde | Total | Mole ratio of formaldehyde to phenol |
|---|---|---|---|---|
| 17 | 25 | 25 | 50 | 23.6 |
| 18 | 28 | 2 | 30 | 1.9 |
| 19 | 28 | 7 | 35 | 6.6 |
| 20 | 33 | 1 | 34 | 0.9 |
| 21 | Heat-cured resol resin | | | |
| 22 | Hexamine heat-cured novolak resin | | | |
| 23 | Cured novolak fibers | | | |

TABLE 2

| Run No. | Content of 1–50μ particles (%) | Content of 1–100μ particles (%) | Content of 1–150μ particles (%) | Proportions of particles with a size of 100-mesh under (wt. %) | IR intensity ratio $D_{990-1015}/D_{1600}$ | $D_{890}/D_{1600}$ | Methanol solubility (wt. %) |
|---|---|---|---|---|---|---|---|
| 1 | — | — | — | — | — | — | — |
| 2 | 2 (71) | 2 (79) | 2 (87) | 2 (75) | 0.42 | 0.10 | 97 |
| 3 | 11 (76) | 11 (78) | 11 (81) | 11 (80) | 0.39 | 0.11 | 92 |
| 4 | 57 | 75 | 75 | 69 | 0.65 | 0.13 | 86 |
| 5 | 51 | 55 | 66 | 63 | 1.34 | 0.21 | 83 |
| 6 | 18 (51) | 18 (68) | 18 (90) | 18 (85) | 1.71 | 0.24 | 92 |
| 7 | 74 | 88 | 90 | 85 | 0.34 | 0.10 | 79 |
| 8 | 51 | 59 | 81 | 74 | 1.22 | 0.19 | 75 |
| 9 | — | — | — | — | — | — | — |
| 10 | 84 | 90 | 92 | 82 | 0.91 | 0.12 | 68 |
| 11 | 53 | 60 | 72 | 70 | 1.45 | 0.13 | 87 |
| 12 | 99 | 100 | 100 | 100 | 1.12 | 0.14 | 56 |
| 13 | 93 | 98 | 100 | 97 | 1.21 | 0.13 | 59 |
| 14 | 89 | 96 | 96 | 90 | 0.37 | 0.12 | 68 |
| 15 | 63 | 75 | 75 | 71 | 0.85 | 0.13 | 77 |
| 16 | 77 | 90 | 90 | 83 | 0.47 | 0.11 | 83 |
| 17 | 31 (35) | 31 (48) | 31 (74) | 31 (57) | 1.41 | 0.19 | 90 |
| 18 | — | — | — | — | — | — | — |
| 19 | 47 | 56 | 74 | 61 | 0.36 | 0.10 | 76 |
| 20 | — | — | — | — | — | — | — |
| 21 | 15 | 87 | 100 | — | 0.11 | 0.08 | 0.1 |
| 22 | 43 | 82 | 100 | — | 3.36 | 0.07 | 1.6 |
| 23 | 26 | 55 | 67 | — | 0.83 | 0.21 | 0.2 |

In Runs Nos. 1, 9, 18 and 20 shown in Table 1, it was difficult to obtain a granular or powdery solid. In Runs Nos. 2, 3, 6 and 17, a large amount of a sticky resin or a lumpy mass formed at the bottom of the separable flask.

In Runs Nos. 2, 3, 6 and 17, the contents of particles having a size of 1 to 50 microns, 1 to 100 microns and 1 to 150 microns and the proportion of particle having a size of 100-mesh under shown in Table 2 are based on the entire solid including the sticky reisn, lumpy mass and plate-like mass. The contents of these particles and the proportions of the 100 mesh under particles based only on the granular and powdery product in these Runs are shown in the parentheses in Table 2.

(4) FIG. 1A of the accompanying drawings show an optical microphotography (magnification 400) of the granular or powdery product obtained in Run No. 12, and FIG. 1B shows a scanning electron microphotograph (magnification 1,000) of the granular or powdery product obtained in Run No. 12.

EXAMPLE 2

In a room kept at 21° to 22° C., 8 kg of a mixed aqueous solution containing 20% by weight of hydrochloric acid and 10% by weight of formaldehyde was put in each of six 10-liter reaction vessels. With stirring at 20° C., a mixed aqueous solution containing 80% by weight of phenol and 3.7% by weight of formaldehyde was added to the vessels in an amount of 1.43 kg, 1.18 kg, 0.80 kg, 0.55 kg, 0.34 kg and 0.23 kg, respectively. The bath ratio was 7.3, 8.8, 12.8, 18.4, 29.9, and 43.7, respectively.

In all of these cases, continued stirring after addition of the mixed aqueous phenol solution resulted in the abrupt formation of white suspended particles in 50 to 170 seconds. The stirring was stopped as soon as the white suspended particles formed, and the suspension was left to stand for 3 hours, The temperature of the inside of the reaction system gradually rose, and the contents of the vessel gradually turned pale pink. In all of these runs, the formation of a slurry-like or resin-like product was observed in 30 minutes after the formation of the white suspended particles. The reaction mixture was washed with water with stirring. With the reaction mixture obtained in a system having a bath ratio of 7.3, a large amount of resin melt-adhered to the stirring rod and the stirring was difficult. The reaction mixture was then treated for 2 hours in a 0.3% by weight aqueous ammonia solution while it was stirred slowly at 30° C. Then, it was washed with water, and dehydrated. The resulting granular or powdery product or lumpy mass was lightly crumpled by hand, and dried at 40° for 3 hours. After drying, the products all had a water content of less than 0.5% by weight. The resulting products are designated as Runs Nos. 31, 32, 33, 34, 35 and 36 in the increasing order of the bath ratio.

Table 3 summarizes the maximum temperature reached of the reaction system from the initiation of the reaction to 3 hours after the formation of the white suspended particles; the yield of the reaction product; the presence or absence of spherical primary paticles by microscopic observation; the proportion of particles having a size of 100 Tyler mesh under in the reaction product; the bulk density of the particles having a size of 100 Tyler mesh under; the heat fusibility of the reaction product at 100° C.; the methanol solubility of the product; and the free phenol content of the product.

about 20% of the entire solid, but about 85% thereof passed through a 100 Tyler mesh sieve. In the column showing the presence or absence of spherical primary particles, "little" for Run No. 31 is because the proportion of the granular or powdery product based on the entire solid was as small as about 20%. Thus, the method of Run No. 31 is not recommendable, but the resulting granular or powdery product is included within the granular or powdery product of this invention.

In Runs Nos. 31 to 36, almost all of the granular or powdery products consisted of particles having a size of 1 to 100 microns.

EXAMPLE 3

One thousand grams of a mixed aqueous solution at 25° C. containing 18% by weight of hydrochloric acid and 9% by weight of formaldehyde was put into each of six 1-liter separable flasks. The room temperature was 15° C. With stirring, 40 g of phenol diluted with 5 g of water was added at a time to the solution. In each run, the stirring was stopped in 50 seconds after the addition of the diluted solution of phenol. In 62 to 65 seconds after the stopping of the stirring, white suspended particles abruptly formed to give a milk-white product. The milk-white product gradually turned pink. The temperature of the liquid gradually rose from 25° C., and reached a maximum temperature of 35° to 36° C. in 16 to 17 minutes after the addition. The reaction mixture was allowed to stand for 0.5 hour (Run No. 41), 1 hour (Run No. 42), 2 hours (Run No. 43), 6 hours (Run No. 44), 24 hours (Run Nos. 45), and 72 hours (Runs No. 46), respectively, at room temperature, washed with water, treated in 1% by weight aqueous ammonia at 15° to 17° C. for 6 hours, washed with water, dehydrated, and finally dried at 40° C. for 6 hours.

Table 4 summarizes the proportion of particles which

TABLE 3

| Run No. | Bath ratio | Maximum temperature reached of the reaction system (°C.) | Yield (wt. %) | Proportion of particles having a size of 100-mesh under (wt. %) | Bulk density of the 100-mesh under particles (g/cc) | Presence or absence of spherical primary particles | Heat fusibility at 100° C. | Methanol solubility (wt. %) | Free phenol content (ppm) |
|---|---|---|---|---|---|---|---|---|---|
| 31 | 7.3 | 33.0 | 106 | 18 | 0.21 | Little | Melt-adhered | 96 | 290 |
| 32 | 8.8 | 34.0 | 112 | 57 | 0.16 | Much | Melt-adhered | 77 | 112 |
| 33 | 12.8 | 34.5 | 116 | 78 | 0.14 | Mostly | Melt-adhered | 65 | 69 |
| 34 | 18.4 | 34.5 | 117 | 87 | 0.12 | " | Melt-adhered | 67 | 72 |
| 35 | 29.9 | 33.5 | 116 | 92 | 0.11 | " | Melt-adhered | 69 | 72 |
| 36 | 44.7 | 33.0 | 116 | 90 | 0.11 | " | Melt-adhered | 74 | 97 |
| 21 | Same as in Table 1 | — | — | 0.68 | None | Non-fusible | 0.1 | (34,000) |
| 22 | " | | — | — | 0.51 | " | Melt-adhered | 1.6 | (7,600) |
| 23 | " | | — | — | 0.29 | " | Non-fusible | 0.2 | (7,600) |

In Table 3, the free phenol contents of the resins in Runs Nos. 21, 22 and 23 (comparisons shown in Table 1) are those measured of the resol and novolak resins before heat curing and are indicated in the parentheses.

In Run No. 31 in Table 3, a sticky resin and a lumpy mass in a total amount reaching about 80% of the entire solid formed at the bottom of the flask. Thus, the proportion of a granular or powdery product was only passed through a 100 Tyler mesh sieve, the $D_{990-1015}/D_{1600}$ ratio and $D_{890}/D_{1600}$ ratios, the methanol solubility and free phenol content of the products.

The samples obtained in Runs Nos. 41 to 46 all melt-adhered in a heat fusibility test conducted at 100° C. for 5 minutes.

FIGS. 2A and 2B show an optical and a scanning electron microphotograph of the product obtained in Run No. 44.

FIG. 3 shows an infrared absorption spectral chart of the granular or powdery resin obtained in Run No. 44. FIG. 3 also illustrates the method of determining $t_p$ and $t_b$ required for obtaining the absorption intensity D. A base line is drawn across a certain peak, and $t_p$ and $t_b$ can be determined as illustrated at the wavelength of the peak.

TABLE 4

| Run No. | Proportion of particles which passed through a 100 Tyler mesh sieve (wt. %) | IR intensity ratio $D_{990-1015}/D_{1600}$ | $D_{890}/D_{1600}$ | Methanol solubility (wt. %) | Free phenol content (ppm) |
| --- | --- | --- | --- | --- | --- |
| 41 | 59 | 0.53 | 0.10 | 97 | 310 |
| 42 | 83 | 0.87 | 0.12 | 80 | 116 |
| 43 | 94 | 1.06 | 0.13 | 71 | 85 |
| 44 | 97 | 1.12 | 0.13 | 67 | 774 |
| 45 | 96 | 1.12 | 0.14 | 64 | 73 |
| 46 | 97 | 1.13 | 0.13 | 63 | 70 |

EXAMPLE 4

1.5 kg of a mixed aqueous solution containing 18% by wwight of hydrochloric acid and 9% by weight of formaldehyde was put in each of seven 2-liter separable flasks. The separable flask was dipped in ice water, cold water or warm water to adjust the temperature of the mixed aqueous solution to 2° to 3° C. (Run No. 51), 7° to 8° C. (Run No. 52), 13° to 14° C. (Run No. 53), 27° to 28° C. (Run No. 54), and 32° to 33° C. (Run No. 55), respectively. While the mixed aqueous solution was stirred, an aqueous solution of phenol was added at a time in an amount of 50 g as phenol. The stirring was stopped, and the reaction mixture was left to stand for 5 hours. In 30 minutes after the stopping of the stirring, cold water or warm water was removed from the separable flask. The resulting product was washed with water, treated in a 0.1% by weight aqueous solution of sodium hydroxide at 20° C. for 1 hour, further treated in a 1% by weight aqueous solution of ammonia at 25° C. for 2 hours, washed with water, again washed with water, and dehydrated. The resulting reaction product was lightly crumpled by hand and dried at b 45° C. for 5 hours.

Table 5 shows the concentration of the aqueous phenol solution added, the maximum temperature reached of the reaction system, the methanol solubility of the resulting product, and the proportion of particles which passed through a 100 Tyler mesh sieve.

TABLE 5

| Run No. | Temperature of the mixed aqueous solution (°C.) | Concentration of phenol (wt. %) | Maximum temperature of the reaction system reached (°C.) | Methanol solubility (wt. %) | Proportion of particles which passed through a 100 Tyler mesh sieve (wt. %) |
| --- | --- | --- | --- | --- | --- |
| 51 | 2–3 | 95 (42° C.) | 18 | 97 | 11 |
| 52 | 7–8 | 95 (42° C.) | 26 | 91 | 57 |
| 53 | 13–14 | 90 (22° C.) | 28 | 86 | 82 |
| 54 | 27–28 | 85 (22° C.) | 36.5 | 53 | 94 |
| 55 | 32–33 | 85 (22° C.) | 43.0 | 27 | 85 |

(*) The parenthesized temperature figures are the temperatures of the aqueous phenol solutions added.

EXAMPLE 5

A 1000-liter reaction vessel equipped with a stirring rod was charged with 800 kg of a mixed aqueous solution at 18° C. containing 18.5% by weight of hydrochloric acid and 8.5% by weight of formaldehyde, and while the mixed aqueous solution was stirred, 36.4 kg of a 88% by weight aqueous solution of phenol at 20° C. was added. After the addition of all of the aqueous phenol solution, the mixture was stirred for 60 seconds. The stirring was then stopped, and the mixture was left to stand for 2 hours. In the reaction vessel, white suspended particles formed abruptly in 85 seconds after the addition of all of the aqueous phenol solution. The white suspended particles gradually turned pale pink, and the temperature of the suspension gradually rose to 34.5° C. and again decreased. Thereafter, while the mixed aqueous solution in which the reaction product formed was stirred, a value secured to the bottom of the reaction vessel was opened, and the contents were withdrawn and separated into the reaction product and the mixed aqueous solution of hydrochloric acid and formaldehyde by using a nonwoven fabric (Nomex, a tradename for a product of E. I. du Pont de Nemous & Co.). The reaction product was washed with water, dehydrated, dipped for a day and night in a 0.5% by weight aqeous solution of ammonia at 18° C., again washed with water, and dehydrated to give 44.6 kg of the reaction product having a water content of 15% by weight.

2.0 kg of the reaction product so obtained was dried at 40° C. for 3 hours to give 1.7 kg of a sample (Run No. 60).

Table 6 shows the contents of 0.1–50 micron particles and 0.1–100 micron particles of the dried sample obtained, the proportion of particles which passed through a 100 mesh Tyler mesh sieve, the $D_{990-1015}/D_{1600}$ and $D_{890}/D_{1600}$ ratios, and the methanol solubility of the product.

TABLE 6

| Run No. | Content of 0.1–50 micron particles (%) | Content of 0.1–100 micron particles (%) | Proportion of particles which passed a 100 Tyler mesh sieve (wt. %) | IR intensity ratio $D_{990-1015}/D_{1600}$ | $D_{890}/D_{1600}$ | Methanol solubility (wt. %) |
| --- | --- | --- | --- | --- | --- | --- |
| 60 | 96 | 100 | 99 | 1.18 | 0.13 | 47 |

EXAMPLE 6

750 g of a mixed aqueous solution at 22° C. containing 18% by weight of hydrochloric acid, 10% by weight of formaldehyde and 5% by weight of zinc chloride was put in each of three 1-liter separable flasks. With stirring, a mixed aqueous solution consisting of 90% by weight of each of the phenols shown in Table 7 and 10% by weight of 37% by weight formalin was added in an amount of 25 g. The stirring was stopped 30 seconds after the addition. The mixture was left to stand for 2 hours after the stopping of the stirring, and then the contents of the flask were taken out. The contents were washed with water, treated in a 1% by weight aqueous solution of ammonia at 22° C. for 3 hours, further washed with water, dehydrated, and finally dried at 40° C. for 5 hours.

Table 7 summarizes the types and proportions of the phenols used, the time at which white suspended particles began to form after the addition of the phenol solution, the elemental analysis values of the product, and the proportion of particles which passed through a 100 Tyler mesh sieve.

seconds, and thereafter left to stand for 60 minutes. During the 60-minute standing, the contents of the separable flask remained clear (Runs Nos. 101 and 120 in Table 8), or turned from a clear solution to a whitely turbid suspension and remained whitely turbid (Runs Nos. 103, 109 and 118 in Table 8), or turned from a clear solution to a whitely turbid suspension and gave a white precipitate (Runs Nos. 102, 104–108, 110–117, and 119). By microscopic observation, this white precipitate was found to contain spherical particles, an agglomerated mass of spherical particles, and a small amount of a powder.

During the 60-minute standing, the temperature of each of the reaction systems rose gradually as a result of the generation of heat (the temperature at peak 31.5° to 37.5° C.), and again decreased. After standing for 90 minutes, the reaction product was taken out, washed with water, and treated in a 0.5% by weight aqueous ammonia solution at 22° C. for 3 hours while the mixture was slowly stirred. The treated product was again washed with water, dehydrated, and dried at 40° C. for 5 hours. The properties of the resulting products are shown in Table 9.

TABLE 7

| Run No. | Types and proportions of the phenols (wt. %) | Time at which white suspended particles began to form (seconds) | Elemental analysis (wt. %) | | | Proportion of particles which passed through a 100 Tyler mesh sieve (wt. %) |
|---|---|---|---|---|---|---|
| | | | C | H | O | |
| 61 | Phenol (100) | 55 | 75.1 | 5.7 | 19.2 | 96 |
| 62 | Phenol/m-cresol (=85/15) | 69 | 74.7 | 5.9 | 19.4 | 87 |
| 63 | Phenol/resorcinol (=85/15) | 43 | 74.1 | 5.6 | 20.3 | 99 |

(*) In the elemental analysis, the proportion of O was obtained by subtracting the total proportion of C and H from 100%.

EXAMPLE 7

(1) A 2-liter separable flask was charged with 1.5 kg of a mixed aqueous solution at 25° C. of hydrochloric acid and formaldehyde in the various concentrations shown in Table 8, and while the mixed aqueous solution was stirred, 125 g of a mixed aqueous solution at 25° C. containing 20% by weight of phenol, 20% by weight of urea and 14.6% by weight of formaldehyde prepared from 98% by weight phenol (the remaining 2% by weight being water), urea, 37% by weight formalin and water was added. The mixture was then stirred for 15

(2) Table 8 summarizes the concentrations of hydrochloric acid and formaldehyde used, the total concentration of hydrochloric acid and formaldehyde, the proportion of the weight of the HCl-formaldehyde solution based on the total weight of the phenol and urea, and the mole ratio of formaldehyde to phenol + urea. Table 9 summarizes the contents of particles having a size of 0.1 to 50 microns and 0.1 to 100 microns respectively, the amount of particles which passed through a 150 Tyler mesh sieve, and the $D_{960-1020}/D_{1450-1500}$, $D_{1280-1360}/D_{1450-1500}$ and $D_{1580-1650}/D_{1450-1500}$ ratios of the resulting products.

TABLE 8

| Run No. | Concentrations of the HCl—formaldehyde bath (wt. %) | | | Proportion of the weight of the HCl—HCHO bath based on the total amount of phenol and urea (wt. %) | | Mole ratio of total HCHO to the mixture of phenol and urea |
|---|---|---|---|---|---|---|
| | HCl | HCHO | Total | HCl | HCHO | |
| 101 | 3 | 1 | 4 | 90 | 30 | 1.6 |
| 102 | 3 | 28 | 31 | 90 | 840 | 21.2 |
| 103 | 5 | 2 | 7 | 150 | 60 | 2.3 |
| 104 | 5 | 10 | 15 | 150 | 310 | 8.1 |
| 105 | 5 | 22 | 27 | 150 | 660 | 16.8 |
| 106 | 7 | 30 | 37 | 210 | 900 | 22.6 |
| 107 | 10 | 7 | 17 | 300 | 210 | 5.9 |
| 108 | 10 | 18 | 28 | 300 | 540 | 13.9 |
| 109 | 12 | 3 | 15 | 360 | 90 | 3.0 |
| 110 | 15 | 5 | 20 | 450 | 150 | 4.5 |
| 111 | 15 | 22 | 37 | 450 | 660 | 16.8 |
| 112 | 18 | 10 | 28 | 540 | 300 | 8.1 |
| 113 | 20 | 7 | 27 | 600 | 210 | 5.9 |
| 114 | 22 | 4 | 26 | 660 | 120 | 3.8 |
| 115 | 22 | 17 | 39 | 660 | 510 | 13.2 |

TABLE 8-continued

| | Concentrations of the HCl—formaldehyde bath (wt. %) | | | Proportion of the weight of the HCl—HCHO bath based on the total amount of phenol and urea (wt. %) | | Mole ratio of total HCHO to the mixture |
|---|---|---|---|---|---|---|
| Run No. | HCl | HCHO | Total | HCl | HCHO | of phenol and urea |
| 116 | 25 | 6 | 31 | 750 | 180 | 5.2 |
| 117 | 25 | 25 | 50 | 750 | 750 | 19.0 |
| 118 | 28 | 3 | 31 | 780 | 90 | 2.6 |
| 119 | 28 | 7 | 35 | 780 | 210 | 5.9 |
| 120 | 33 | 1 | 35 | 990 | 30 | 1.6 |
| 21 | Heat-cured product of resol | | | | | |
| 22 | Hexamine heat-cured product of novolak | | | | | |
| 23 | Cured novolak fibers | | | | | |

TABLE 9

| Run No. | Content of 0.1–50 micron particles (%) | Content of 0.1–100 micron particles (%) | Proportion of particles which passed through a 150 Tyler mesh sieve (wt. %) | IR intensity ratio | | | Methanol solubility (wt. %) | Free phenol content (ppm) |
|---|---|---|---|---|---|---|---|---|
| | | | | $D_{1580-1850}/D_{1450-1500}$ | $D_{1280-1360}/D_{1450-1500}$ | $D_{960-1020}/D_{1450-1500}$ | | |
| 101 | 11(95) | 11(100) | 11(81) | 0.33 | 0.18 | 0.09 | 99.5 | 155 |
| 102 | 4(80) | 4(86) | 4(50) | 0.51 | 0.26 | 0.39 | 99.5 | 150 |
| 103 | 21(100) | 21(100) | 21(86) | 0.77 | 0.29 | 0.11 | 97.0 | 115 |
| 104 | 83 | 87 | 57 | 1.71 | 0.33 | 0.40 | 94.5 | 85 |
| 105 | 43 | 49 | 55 | 1.44 | 0.45 | 0.42 | 98.0 | 155 |
| 106 | 5(28) | 5(46) | 5(53) | 1.39 | 0.37 | 0.45 | 99.5 | 160 |
| 107 | 100 | 100 | 89 | 1.37 | 0.54 | 0.27 | 55.0 | 30 |
| 108 | 100 | 100 | 82 | 1.26 | 0.58 | 0.38 | 60.0 | 35 |
| 109 | 85 | 100 | 67 | 1.21 | 0.36 | 0.27 | 73.0 | 35 |
| 110 | 100 | 100 | 87 | 1.28 | 0.65 | 0.22 | 60.5 | 35 |
| 111 | 65 | 95 | 64 | 1.22 | 0.61 | 0.34 | 81.5 | 40 |
| 112 | 100 | 100 | 100 | 1.43 | 0.73 | 0.23 | 50.0 | 25 |
| 113 | 100 | 100 | 100 | 1.32 | 0.68 | 0.21 | 52.5 | 30 |
| 114 | 85 | 90 | 62 | 1.41 | 0.29 | 0.19 | 85.5 | 45 |
| 115 | 55 | 85 | 74 | 1.53 | 0.67 | 0.38 | 91.0 | 65 |
| 116 | 92 | 99 | 81 | 1.51 | 0.35 | 0.29 | 85.5 | 45 |
| 117 | 6(84) | 6(92) | 6(59) | 1.09 | 0.44 | 0.42 | 99.5 | 140 |
| 118 | 43 | 81 | 60 | 1.38 | 0.23 | 0.16 | 93.5 | 105 |
| 119 | 55 | 94 | 63 | 1.21 | 0.51 | 0.28 | 88.0 | 45 |
| 120 | 4(23) | 4(65) | 4(52) | 0.77 | 0.21 | 0.11 | 99.5 | 145 |
| 21 | 17 | — | — | 0.22 | 0.10 | 0.03 | not more than 1 | below 5 |
| 22 | 58 | — | — | 0.50 | 0.13 | 3.73 | 1.6 | " |
| 23 | 39 | — | — | 0.15 | 0.08 | 0.14 | not more than 1 | " |

In Runs Nos. 101, 102, 106, 117 amd 120, a large amount of a sticky resin, a hard large lumpy or plate-like mass formed at the bottom formed at the bottom of the separable flasks.

In Runs Nos. 101, 102 and 120, only less than 49 g of a solid was obtained from 25 g of phenol and 25 g of urea used.

The contents of particles having a size of 0.1–50 microns and 0.1–100 microns and the proportion of particles which passed the 150 Tyler mesh sieve given in Table 9 are based on the entire solid including the sticky resin, lump mass and plate-like mass. The contents of these and the proportion of the particles which passed through the 150 Tyler mesh sieve, based on the granular or powdery product alone in the resulting solid, are given in the parentheses in Table 9.

The IR intensity ratios, the methanol solubility, and the free phenol content were measured with regard to the resulting granular or powdery products.

(3) FIG. 4A shows a scanning electron microphotograph (magnification 1,000) of the granular of powdery product obtained in Run No. 112, and FIG. 4B shows a scanning electron microphotograph (magnification 3,000) of the granular or powdery product obtained in run No. 112.

FIG. 7 shows an infrared absorption spectral chart of the granular or powdery product obtained in Run No. 112, and also illustrate how to determine $t_p$ and $t_b$, which are required in obtaining the absorption intensity D, from the infrared absorption spectral chart. A base line is drawn across a certain peak, and $t_p$ and $t_b$ can be determined at the wavelength of the peak as illustrated.

EXAMPLE 8

Ten kilograms of a mixed aqueous solution containing 18% by weight of hydrochloric acid and 11% by weight of formaldehyde was put in each of six 20-liter reaction vessels in a room kept at a temperature of 21° to 22° C. While the mixed aqueous solution was stirred at 23° C., a mixed aqueous solution containing 30% by weight of phenol, 20% by weight of urea and 11% by weight of formaldehyde was added in an amount of 3.34 kg, 2.66 kg, 1.60 kg, 1.06 kg, 0.74 kg, and 0.45 kg, respectively. The bath ratio at this time was 7.0, 8.5, 13.5, 20.0, 28.0, and 45.0, respectively. In all runs, when the stirring was continued after the addition of the mixed aqueous solution containing phenol, the mixture abruptly became whitely turbid in 10 to 60 seconds. The stirring was stopped as soon as the mixture became whitely turbid. The mixture was then left to stand for 3 hours. The temperature of the mixture gradually rose, and in 30 minutes after it became whitely turbid, the formation of a white slurry-like or resin-like product was observed. With stirring, the reaction mixture was washed with water. With the reaction mixture obtained at a bath ratio of 7.0, a large amount of a resinous hardened product melt-adhered to the stirring rod, and the stirring became very difficult.

The contents of the reaction vessel were treated in a 0.3% by weight aqueous solution of ammonia at 30° C. for 2 hours with slow stirring, washed with water, and dehydrted. The resulting granular or powdery product or mass was lightly crumpled by hand, and dried at 40° C. for 3 hours. After drying, the products had a water content of less than 0.5% by weight. The contents of the vessels are designated as Runs Nos. 131, 132, 133, 134, 135 and 136 in the increasing order of the bath ratio.

Table 10 summarizes the maximum temperature reached of the reaction system during the time from the initiation of the reaction to 3 hours after the reaction system became whitely turbid, the yield of the reaction product, the presence or absence of spherical primary particles by microscopic observation, the proportion of particles which passed through a 150 Tyler mesh sieve, the bulk density of the particles which passed through the 150 Tyler mesh sieve, the heat fusibility of the reaction product at 100° C., the methanol solubility of the product, and the free phenol content of the product.

the column of the presence or absence of spherical primary particles indicated in Table 10 for Run No. 131 was because the proportion of the granular or powdery product based on the entire solid product was as small as about 20%. Hence, the method of Run No. 131 cannot be recommended as a manufacturing method, but the resulting granular or powdery product is included within the granular or powdery product defined in this invention.

Almost 100% of each of the granular or powdery products obtained in Runs Nos. 131 to 136 consisted of particles having a particle size of 0.1 to 100 microns.

EXAMPLE 9

A 2-liter separable flask was charged with 1,250 g of a mixed aqueous solution at 24° C. containing 20% by weight by hydrochloric acid and 8% by weight of formaldehyde, and while it was stirred, a solution of each of the phenols shown in Table 11 and each of the nitrogen compounds shown in Table 11 diluted to a concentration of 20 to 80% by weight with 37% by weight formalin was added so that the total amount of the phenol and the nitrogen-containing compound became 50 g. As soon as the solution containing the phenol and the nitrogen-containing compound were added, the mixture became turbid, and in some Runs, instantaneously turned white, pink or brown. In 10 seconds after the addition of the solution, the stirring was stopped. After the stopping of the addition, the mixture was left to stand for 90 minutes, and again stirred for 30 minutes. The resulting product was washed with water, then treated in a 0.5% by weight aqueous solution of ammonia at 25° C. for 5 hours, washed with water,

TABLE 10

| Run No. | Bath ratio | Maximum temperature of the reaction system reached (°C.) | Yield (wt. %) | Proportion of particles which passed through a 150 Tyler mesh sieve (wt. %) | Bulk density of the 150 Tyler mesh under particles (g/cc) | Presence or absence of spherical primary particles | Fusibility at 100° C. | Methanol solubility (wt. %) | Free phenol content (ppm) |
|---|---|---|---|---|---|---|---|---|---|
| 131 | 7.0 | 39.5 | 100 | 11 | 0.19 | Little | Melt-adhered | 83.8 | 150 |
| 132 | 8.5 | 39.0 | 113 | 56 | 0.16 | Much | Melt-adhered | 67.7 | 50 |
| 133 | 13.5 | 38.0 | 124 | 88 | 0.14 | Mostly | Melt-adhered | 60.4 | 35 |
| 134 | 20.0 | 36.5 | 128 | 100 | 0.12 | " | Melt-adhered | 53.6 | 30 |
| 135 | 28.0 | 36.0 | 128 | 100 | 0.11 | " | Melt-adhered | 54.4 | 25 |
| 136 | 45.0 | 36.0 | 129 | 99 | 0.11 | " | Melt-adhered | 52.6 | 25 |
| 21 | (Comparison; see Table 1) | — | — | — | 0.62 | None | Infusible | Not more than 1 | Below 5 |
| 22 | (Comparison; see Table 1) | — | — | — | 0.46 | " | Melt-adhered | 1.6 | " |
| 23 | (Comparison; see Table 1) | — | — | — | 0.24 | " | Infusible | Not more than 1 | " |

In Table 10, the free phenol contents in Runs Nos. 21, 22 and 23 are values measured with regard to resol and novolak resins before heat-curing and are indicated in the parentheses.

In Run No. 131 shown in Table 10, a sticky resin and a bulky mass formed in an amount of about 80% based on the entire solid formed at the bottom of the flask, and the proportion of the resulting granular or powdery product was only about 20% based on the entire solid. About 85% of such granular or powdery product passed through a 100 Tyler mesh sieve. The "little" in dehydrated, and finally dried at 40° C. for 6 hours.

Table 11 summarizes the types and proportions of the phenol and the nitrogen-containing compound used, the concentrations of the phenol and the nitrogen-containing compound in the formalin-diluted solution, the color of the reaction product observed 60 minutes after the addition of the resulting diluted solution, the yield of the reaction product based on the total amount of the phenol and the nitrogen-containing compound, the contents of particles having a size of 0.1 to 50 microns in the reaction product, the proportion of particles which passed through a 150 Tyler mesh sieve, the $D_{960-1020}/D_{1450-1500}$ ratio, and the methanol solubility of the product.

Figure 1A:
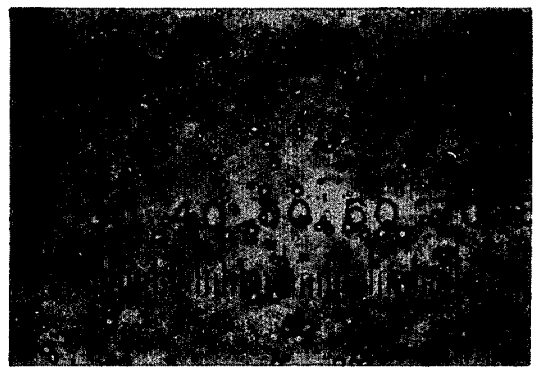
Figure 1B:
Figure 2A:
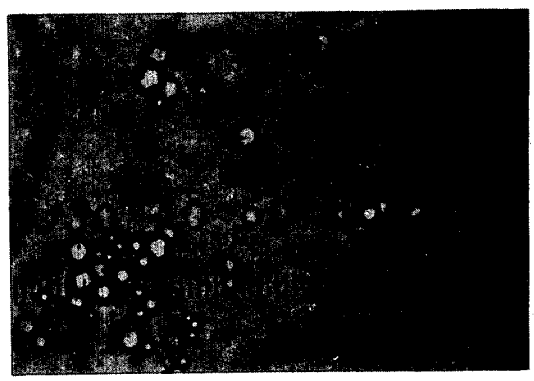
Figure 2B:
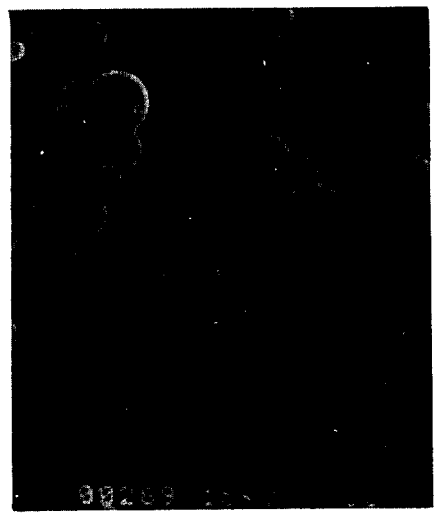
Figure 3:
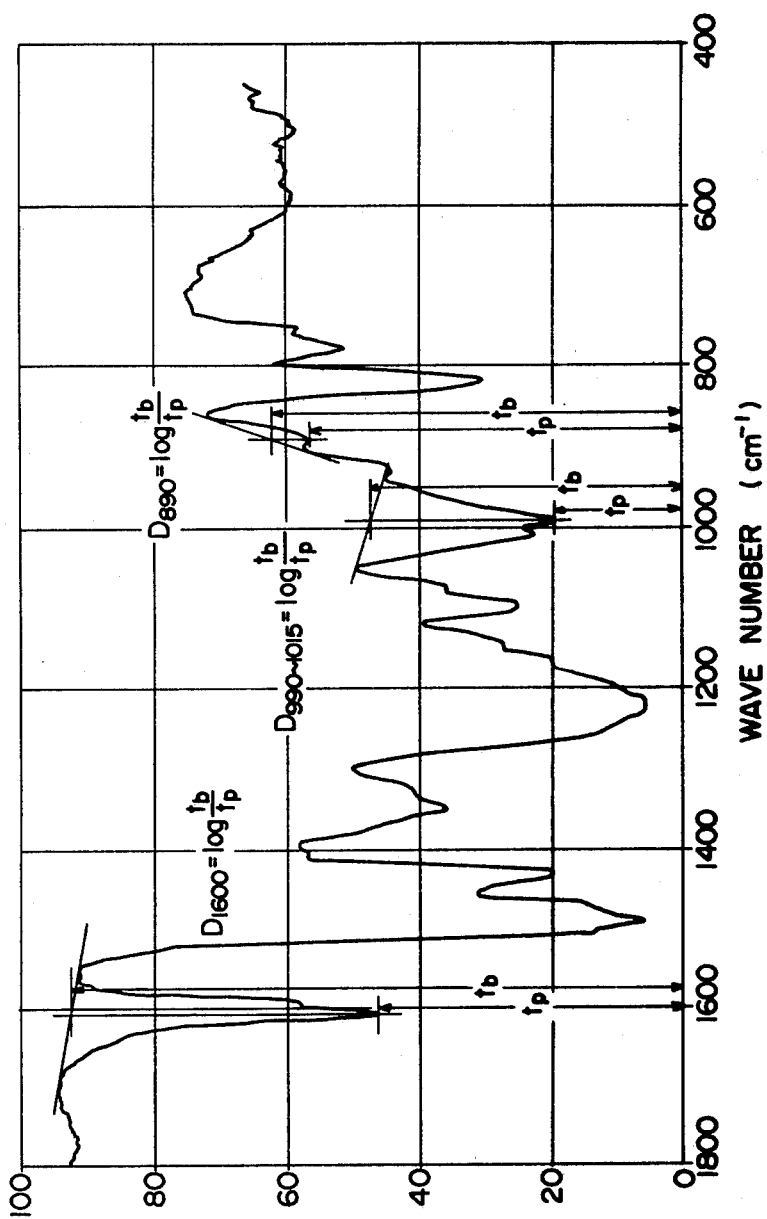
Figure 4A:
Figure 4B:
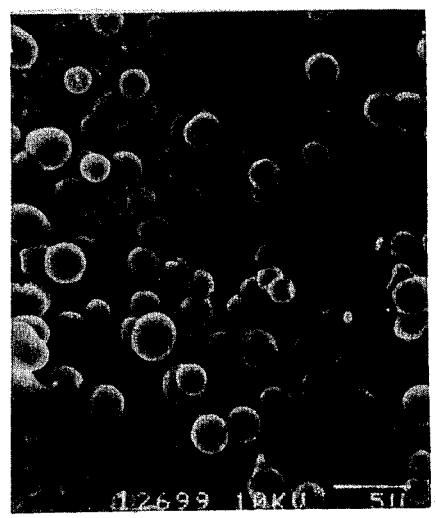
Figure 5A:
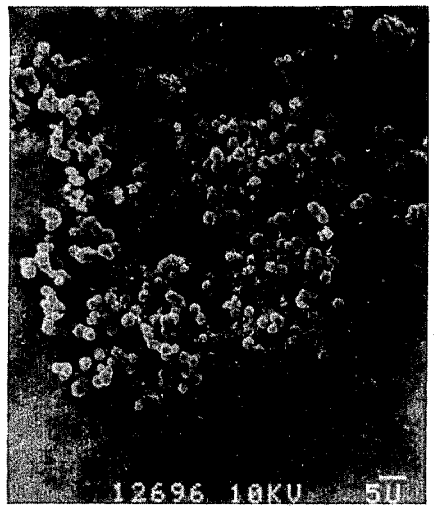
FIGS. 5A and 5B show scanning electron microphotographs (magnification 1,000 and 3,000 respectively) of the product obtained in Run No. 140.
Figure 5B:
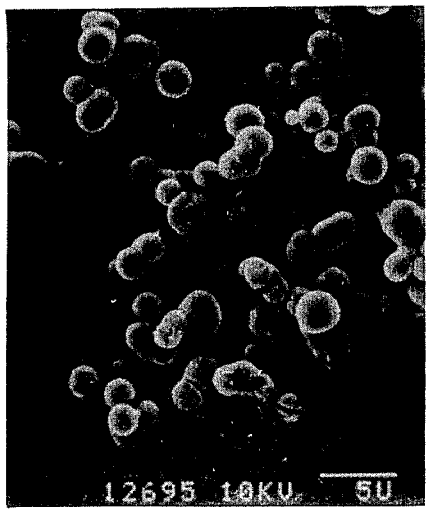
Figure 6A:
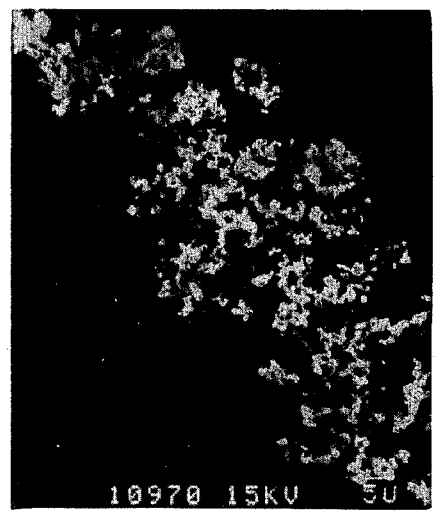
FIGS. 6A and 6B show scanning electron microphotographs (magnification, 1,000 and 3,000 respectively) of the product obtained in Run No. 150.
Figure 6B:
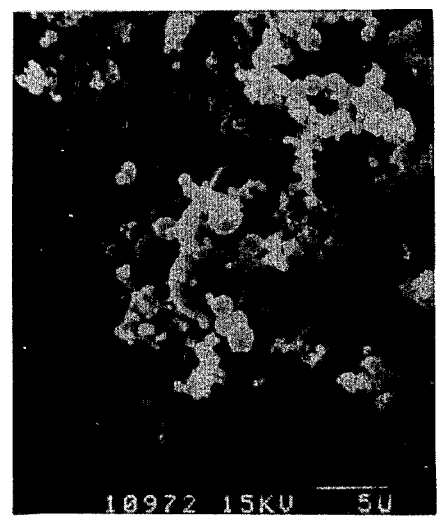
Figure 7:
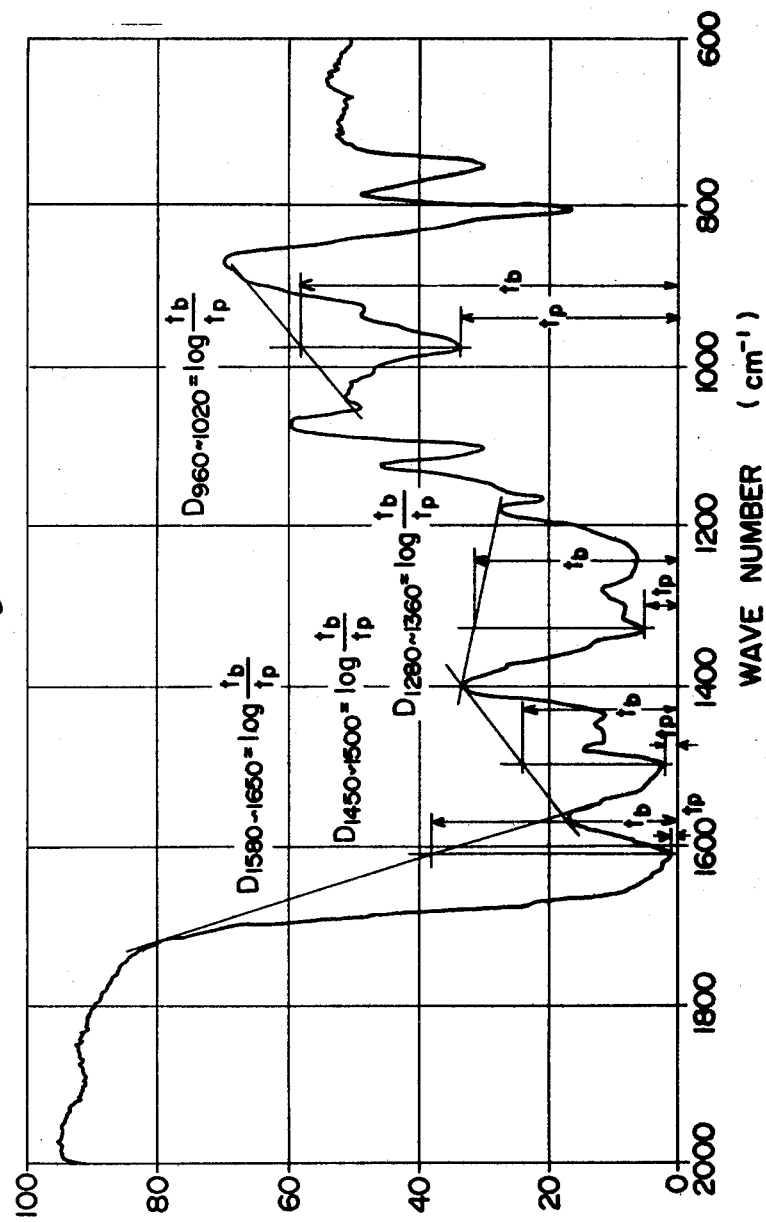

Then, the contents of the flask were treated in a 0.75% by weight aqueous solution of ammonia at 15° to 17° C. for 3 hours, washed with water, dehydrated, and finally dried at 40° C. for 6 hours.

Table 12 summarizes the proportion of particles which passed through a 150 Tyler mesh sieve, the $D_{960-1020}/D_{1450-1500}$ ratio, the methanol solubility, and the free phenol content of the resulting dried products. The samples obtained in Runs Nos. 161 to 166 all melt-adhered in a fusibility test conducted at 100° C. for 5 minutes.

TABLE 11

| Run No. | Proportions of the materials (wt. %) Phenol | Proportions of the materials (wt. %) Nitrogen-containing Compound | Concentration of the materials in the diluted solution (wt. %) | Color of the reaction product (60 minutes after addition) | Yield (wt. %) | Content of 0.1–50 micron particles (%) | Proportion of particles which passed through a 150 Tyler mesh sieve (wt. %) | $D_{960-1020}/D_{1450-1500}$ ratio | Methanol solubility (wt. %) |
|---|---|---|---|---|---|---|---|---|---|
| 137 | Phenol 100 | Urea 0 | 80 | Pink | 111 | 96 | 94 | 0.33 | 37 |
| 138 | Phenol 97 | Urea 3 | " | " | 102 | 94 | 94 | 0.29 | 55 |
| 139 | Phenol 94 | Urea 6 | " | " | 108 | 99 | 98 | 0.28 | 58 |
| 140 | Phenol 75 | Urea 25 | 50 | Pale pink | 126 | 100 | 100 | 0.16 | 60 |
| 141 | Phenol 55 | Urea 45 | 40 | White | 127 | 100 | 100 | 0.24 | 63 |
| 142 | Phenol 35 | Urea 64 | 30 | " | 114 | 100 | 100 | 0.24 | 68 |
| 143 | Phenol 25 | Urea 75 | 20 | " | 73 | 94 | 95 | 0.26 | 77 |
| 144 | Phenol 10 | Urea 90 | 20 | " | 29 | 85 | 82 | 0.23 | 74 |
| 145 | Phenol 50 | N,N'—dimethylol-urea 50 | " | " | 103 | 99 | 95 | 0.31 | 67 |
| 146 | Phenol 75 | Aniline 25 | 80 | Reddish brown | 106 | 95 | 85 | 0.22 | 87 |
| 147 | Phenol 50 | Melamine 50 | 80 | White | 181 | 100 | 100 | 0.23 | 74 |
| 148 | m-Cresol 50 | Urea 50 | 40 | " | 102 | 100 | 100 | 0.24 | 66 |
| 149 | Resorcinol 50 | Urea 50 | " | Red | 101 | 90 | 85 | 0.23 | 45 |
| 150 | Phenol/resorcinol (=34/33) | Urea 33 | " | " | 130 | 95 | 90 | 0.24 | 51 |
| 151 | Phenol/t-butylphenol (=40/20) | Urea 40 | " | Brown | 82 | 100 | 100 | 0.19 | 87 |
| 152 | Phenol 50 | Urea/melamine (=25/25) | 50 | White | 101 | 97 | 100 | 0.27 | 65 |
| 21 | Heat-cured product of resol | | | | | 17 | — | 0.03 | not more than 1 |
| 22 | Hexamine heat-cured product of novolak | | | | | 58 | — | 3.73 | 1.6 |
| 23 | Cured novolak fibers | | | | | 39 | — | 0.14 | not more than 1 |

EXAMPLE 10

Each of six 1-liter separable flasks was charged with 1,000 g of a mixed aqueous solution at 18° C. containing 18% by weight of hydrochloric acid and 9% by weight of formaldehyde. The room temperature was 15° C. While the solution was stirred, 15 g of urea was dissolved in it, and then 25 g of a mixed diluted solution containing 80% by weight of phenol and 5% by weight of formaldehyde was added at a time. Ten seconds after the addition of the diluted solution, the stirring was stopped, and the solution was left to stand. In all Runs, the solution abruptly became whitely turbid in 18 to 19 seconds after the stopping of the stirring, and the formation of milk-white product was observed. The temperature of the solution gradually rose from 18° C., and reached a peak at 31°–32° C. in 5 to 7 minutes after the addition of the diluted solution of phenol, and then decreased. The flask was left to stand at room temperature for 0.5 hour (Run No. 161), 1 hour (Run No. 162), 3 hours (Run No. 163), 6 hours (Run No. 164), 24 hours (Run No. 165), and 72 hours (Run No. 166), respectively, after the addition of the diluted phenol solution.

TABLE 12

| Run No. | Standing time at room temperature (hours) | Proportion of particles which passed through a 150 Tyler mesh sieve (wt. %) | Methanol solubility (wt. %) | IR intensity ratio ($D_{960-1020}/D_{1450-1500}$) | Free phenol content (ppm) |
|---|---|---|---|---|---|
| 161 | 0.5 | 63 | 99.5 | 0.13 | 280 |
| 162 | 1 | 87 | 97.8 | 0.17 | 70 |
| 163 | 3 | 95 | 85.7 | 0.24 | 45 |
| 164 | 6 | 100 | 63.4 | 0.29 | 30 |
| 165 | 24 | 100 | 40.2 | 0.29 | 20 |
| 166 | 72 | 98 | 35.6 | 0.31 | 15 |

EXAMPLE 11

Seven 2-liter separable flasks were each charged with 1.5 kg of a mixed aqueous solution at 20° C. containing 15% by weight of hydrochloric acid, 5% by weight of zinc chloride, 6% by weight of formaldehyde and 5% by weight of acetaldehyde. The separable flasks were dipped in ice water, cold water or warm water to adjust the temperature of the mixed aqueous solution to 2°–3° C. (Run No. 171), 7°–8° C. (Run No. 172), 13°–14° C. (Run No. 173), 27°–28° C. (Run No. 174), and 32°–33° C. (Run No. 175).

While the mixed aqueous solution was stirred, a diluted solution at 18° C. of 10 g of phenol, 10 g of resorcinol and 10 g of urea in 60 g of 37% by weight formalin was added at a time. The stirring was stopped, and the flask was left to stand for 5 hours. Thirty minutes after the stopping of the stirring, the cold or warm water was removed from the separable flask. The contents of the flask were washed with water, treated in a 0.1% by weight aqueous solution of sodium hydroxide at 20° C. for 1 hour, further treated in a 1% by weight aqueous solution of ammonia at 25° C. for 2 hours, washed with water, again washed with water, and dehydrated. The resulting reaction product was lightly crumpled by hand, and dried at 45° C. for 5 hours.

Table 13 summarizes the maximum temperature reached of the reaction system, and the methanol solubility and the free phenol content of the resulting product.

TABLE 13

| Run No. | Temperature of the mixed aqueous solution (°C.) | Maximum temperature reached of the reaction system (°C.) | Methanol solubility (wt. %) | Free particles which phenol content (ppm) | Proportion of passed through a 150 Tyler mesh sieve (wt. %) |
|---|---|---|---|---|---|
| 171 | 2–3 | 8 | 99.7 | 75 | 17 |
| 172 | 7–8 | 15 | 95.4 | 55 | 58 |
| 173 | 14–15 | 22.5 | 88.6 | 45 | 91 |
| 174 | 26–27 | 36 | 57.5 | 25 | 100 |
| 75 | 32–33 | 42.5 | 40.4 | 15 | 97 |
| 121 | Uncured resol resin | | 100 | 34,000 | — |
| 22 | Uncured novolak resin | | 100 | 7,600 | — |

EXAMPLE 12

A 1000-liter reaction vessel equipped with a stirring rod was charged with 800 kg of a mixed aqueous solution at 22.5° C. containing 18.5% by weight of hydrochloric acid and 8.5% by weight of formaldehyde, and while the mixed aqueous solution was stirred, 40 kg of a mixed aqueous solution at 20° C. containing 20% by weight of phenol, 10% by weight of hydroquinone and 20% by weight of urea was added.

After adding all of the phenol solution, the mixture was stirred for 20 seconds. The stirring was stopped, and the mixture was left to stand for 2 hours. In the reaction vessel, white suspended particles abruptly formed in 35 seconds after the addition of all of the phenol solution. A white granular product gradually formed, and the temperature of the suspension gradually rose to 35.5° C. and then decreased. The mixed aqueous solution in which the reaction product formed was again stirred, and a valve secured to the bottom of the reaction vessel was opened to withdraw the contents. By using a nonwoven fabric of Nomex (a tradename for a product of E. I. du Pont de Nemours & Co.), the contents were separated into the reaction product and the mixed aqueous solution of hydrochloric acid and formaldehyde. The resulting reaction product was washed with water, dehydrated, dipped for a day and night in a 0.5% by weight aqueous solution of ammonia at 18° C., again washed with water, and dehydrated to give 29.9 kg of the reaction product having a water content of 15% by weight.

2.0 kg of the reaction product thus obtained was dried at 40° C. for 3 hours to give 1.7 kg of a sample (Run No. 176).

Table 14 gives the contents of particles having a size of 0.1 to 50 microns and particles having a size of 0.1 to 100 microns determined by microscopic observation of the resulting dried sample, its proportion of particles which passed through a 150 Tyler mesh sieve and its methanol solubility.

TABLE 14

| Run No. | Content of 0.1–50 micron particles (%) | Content of 0.1–100 micron particles (%) | Proportion of particles 150 mesh under (wt. %) | Methanol solubility (wt. %) |
|---|---|---|---|---|
| 176 | 100 | 100 | 99 | 58 |

What is claimed is:

1. A granular or powdery resin which is a condensation product of a phenol and an aldehyde and optionally a nitrogen-containing compound having at least two active hydrogens, said granular or powdery resin being characterized by
   (A) containing spherical primary particles and secondary particles resulting from the agglomeration of the primary particles, each of said particles having a particle diameter of 0.1 to 150 microns,
   (B) having such a size that at least 50% by weight thereof can pass through a 100 Tyler mesh sieve,
   (C) having a free phenol content, determined by liquid chromatography, of not more than 500 ppm, and
   (D) having a methanol solubility, S defined by the following equation, of more than 20% by weight $$S = \frac{W_o - W_1}{W_o} \times 100(\%)$$

wherein $W_o$ is the weight in grams of the resin, and $W_1$ is the weight in grams of the resin left after heating under reflux, when about 10 g of the resin is heated under reflux in 500 ml of substantially anhydrous methanol.

2. The resin of claim 1 which is a granular or powdery resin derived from a phenol and an aldehyde, and has a free phenol content, determined by liquid chromatography, of more than 50 ppm but not more than 500 ppm and a $D_{990-1015}/D_{1600}$ ratio of from 0.2 to 9.0 and a $D_{890}/D_{1600}$ ratio of from 0.09 to 1.0 in its infrared absorption spectrum measured by a KBr tablet method wherein $D_{1600}$ represents the intensity of an absorption peak at 1600 cm$^{-1}$, $D_{990-1015}$ represents the highest absorption intensity of absorption peaks in the range of 990 to 1015 cm$^{-1}$, and $D_{890}$ represents the absorption intensity of an absorption peak at 890 cm$^{-1}$.

3. The resin of claim 2 at least 30% of which consists of spherical primary particles and their agglomerated secondary particles each having a particle diameter in the range of 0.1 to 150 microns.

4. The resin of claim 2 or 3 at least 70% by weight of which has a size that can pass through a 100 Tyler mesh sieve.

5. The resin of claim 2 which has a free phenol content, determined by liquid chromatography, of more than 50 ppm but not more than 400 ppm.

6. The resin of claim 2 which has a $D_{990-1015}/D_{1600}$ ratio of from 0.2 to 5.0.

7. The resin of claim 2 which has a $D_{890}/D_{1600}$ ratio of from 0.1 to 0.9.

8. The resin of claim 2 which has a methanol solubility of at least 30% by weight.

9. The resin of claim 2 which consists substantially of 70 to 80% by weight of carbon, 5 to 7% by weight of hydrogen and 17 to 21% by weight of oxygen, the sum total being 100% by weight, by elemental analysis.

10. The resin of claim 2 which is substantially melted or melt-adhered when about 5 grams of the resin is maintained at a temperature of 100° C. for 5 minutes between two 0.2 mm thick stainless steel sheets pressed together at an initial pressure of 50 kg.

11. The resin of claim 1 which is a condensation product of a phenol, an aldehyde and a nitrogen-containing compound having at least two active hydrogens; which contains spherical primary particles and their secondary agglomerated particles each having a particle diameter in the range of 0.1 to 100 microns; at least 50% by weight of which can pass through a 150 Tyler mesh sieve; and which has a $D_{960-1020}/D_{1450-1500}$ ratio of from 0.1 to 2.0 in its infrared absorption spectrum measured by a KBr tablet method wherein $D_{960-1020}$ is the highest absorption intensity of absorption peaks in the range of 960 to 1020 cm$^{-1}$ and $D_{1450-1500}$ is the highest absorption intensity of absorption peaks in the range of 1450 to 1500 cm$^{-1}$.

12. The resin of claim 1 which has a $D_{1280-1360}/D_{1450-1500}$ ratio of from 0.15 to 3.0 in its infrared absorption spectrum measured by a KBr tablet method wherein $D_{1280-1360}/D_{1450-1500}$ is the highest absorption intensity of absorption peaks in the range of 1280 to 1360 cm$^{-1}$.

13. The resin of claim 11 wherein the phenol is phenol, m-cresol, or a mixture of phenol with another phenol.

14. The resin of claim 11 wherein the nitrogen-containing compound contains at least one group selected from the class consisting of amino groups, amido groups, thioamido groups, ureylene groups and thioureylene groups.

15. The resin of claim 14 wherein the nitrogen compound is urea, thiourea, a methylol derivative of urea or thiourea, nailine, melamine, quanidine, quanamine or dicyandiamide.

16. The resin of claim 11 at least 30% of which consists of spherical primary particles and their secondary agglomerated particles each having a particle diameter in the range of 0.1 to 100 microns.

17. The resin of any one of claims 11 to 16 at least 70% by weight of which has a size that can pass through a 150 Tyler mesh sieve.

18. The resin of claim 11 which has a free phenol content, determined by liquid chromatography, of not more than 250 ppm.

19. The resin of claim 12 which has a $D_{1280-1360}/D_{1450-1500}$ ratio of from 0.2 to 1.5.

20. The resin of claim 11 which has a $D_{960-1020}/D_{1450-1500}$ ratio of from 0.15 to 0.6.

21. The resin of claim 11 which has 30 to 80% by weight of a phenol nucleus.

22. The resin of claim 11 which contains at lest 1% by weight of nitrogen.

23. The resin of claim 11 which has a methanol solubility of at least 30% by weight.

24. The resin of claim 11 which is substantially melted or melt-adhered when about 5 grams of the resin is maintained at a temperature of 100° C. for 5 minutes between two 0.2 mm thick stainless steel sheets pressed together at an initial pressure of 50 kg.

25. A process for producing a granular or powdery phenol-aldehyde resin, which comprise contacting a phenol, or both a phenol and a nitrogen-containing compound having at least two active hydrogens with a hydrochloric acid-formaldehyde bath containing (a) hydrochloric acid in a concentration of 3 to 28% by weight and (b) fromaldehyde in a concentration of 3 to 25% by weight and aldehydes other than formaldehyde in a concentration of 0 to 10% by weight with (c) the total concentration of hydrochloric acid and formaldehyde being 10 to 40% by weight, while maintaining a bath ratio, defined by the quotient of the weight of the hydrochloric acid-formaldehyde bath divide by the total weight of the phenol and the nitrogen-containing compound, of at least 8, said contacting being effected such that after contacting of the phenol with the bath, white suspended particles are formed and thereafter developed into a granular or powdery solid, and during the contacting, the temperature of the reaction system is maintained at not more than 45° C.

26. The process of claim 25 wherein the phenol is contacted with a hydrochloric acid-formaldehyde bath containing 5to 28% by weight of hydrochloric acid and 3 to 25% by weight of formaldehyde with the total concentration of hydrochloric acid and formaldehyde being 15 to 40% by weight.

27. The process of claim 25 or 26 wherein the bath ratio is maintained at from 15 to 40.

28. The process of claim 25 or 26 wherein before contacting with the phenol, the temperature of the hydrochloric acid-formaldehyde bath is adjusted to 5° to 35° C.

29. The process of any one of claims 25 or 26 wherein the granular or powdery phenol-aldehyde resin obtained as a solid as a result of the contacting is then separated from the hydrochloric acid-formaldehyde bath, washed with water, treated with an aqueous alkaline solution to neutralize the adhering hydrochloric acid, and further washed with water.

30. The process of claim 29 wherein before contacting with the phenol, the temperature of the hydrochloric acid-formaldehyde bath is adjusted to 5° to 35° C. and the bath ratio is maintained at from 15 to 40.

31. The resin of claim 4 is further characterized by:
a free phenol content, determined by liquid chromatography, of more than 50 ppm but not more than 400 ppm, a $D_{990-1015}/D_{1600}$ ratio of from 0.2 to 5.0, a $D_{890}/D_{1600}$ ratio of from 0.1 to 0.9, a methanol solubility of at least 30% by weight, consisting substantially of 70 to 80% by weight of carbon, 5 to 7% by weight of hydrogen and 17 to 21% by weight of oxygen, the sum total being 100% by weight, by elemental analysis, and a heat fusibility as determined by being substantially melted or melt-adhered when about 5 grams of the resin is maintained at a temperature of 100° C. for 5 minutes between two 0.2 mm thick stainless steel sheets pressed together at an initial pressure of 50 kg.

32. The resin of claim 11 which is further characterized by a particle size such that at least 70% by weight of the resin particles can pass through a 150 Tyler mesh sieve, a free phenol content, determiend by liquid chromatography, of not more than 250 ppm, a $D_{1280-1360}/D_{1450-1500}$ ratio of from 0.2 to 1.5, a $D_{960-1020}/D_{450-1500}$ ratio of from 0.15 to 0.6, containing 30 to 80% by weight of a phenol nucleus and at least 1% by weight of nitrogen, a methanol solubility of at least 30% by weight, and a heat fusibility as determined by being substanitally melted or melt-adhered when about 5 grams of the resin is maintained at a temperature of 100° C. for 5 minutes between two 0.2 mm thick stainless steel sheets pressed together at an initial pressure of 50 kg.

33. The resin of claim 32 wherein the phenol is phenol, m-cresol or a mixture of phenol with another phenol, and wherein the nitrogen-containing compound is urea, thiourea, a methylol derivative of urea or thiourea, aniline, melamine, quanidine, quanamine or dicyandiamide.

34. the resin of claim 33 which has a $D_{1280-1360}/D_{1450-1500}$ ratio of from 0.15 to 3.0 in its infrared absorption spectrum measured by a KBr tablet method wherein $D_{1280-1360}/D_{1450-1500}$ is the highest absorption intensity of absorption peaks in the range of 1280 to 1360 cm$^{-1}$ and in which at least 30% of the resin particles consist of spherical primary particles and their secondary agglomerated particles each having a particle diameter in the range of 0.1 to 100 microns.

35. The resin of claim 2 wherein the phenol is phenol, m-cresol, or a mixture of pheno with another phenol, and the aldehyde consist substantially of formaldehyde and up to 10% by weight of another aldehyde selected from the group consisting of glyoxal, furfual, benzaldehyde, acetaldehyde, propionaldehyde, n-butyl aldehyde, iso-butyl aldehyde and mixtures thereof.

* * * * *

UNITED STATES PATENT AND TRADEMARK OFFICE
CERTIFICATE OF CORRECTION

PATENT NO. : 4,454,298
DATED : June 12, 1984
INVENTOR(S) : HIROAKI KOYAMA, ET AL.

It is certified that error appears in the above—identified patent and that said Letters Patent is hereby corrected as shown below:

Claim 12
    1st line should read "claim 11"
    5th line should read "1280 to 1360 $cm^{-1}$"

Claim 15
    3rd line should read: "aniline"

Claim 22
    1st line should read: "least"

Claim 32
    9th line should read "a $D_{960-1020}/D_{-1450-1500}$"

Claim 35
    5th line should read "furfural"

Signed and Sealed this

Nineteenth Day of February 1985

[SEAL]

Attest:

DONALD J. QUIGG

Attesting Officer     Acting Commissioner of Patents and Trademarks